United States Patent
Williams et al.

(10) Patent No.: US 11,210,251 B2
(45) Date of Patent: Dec. 28, 2021

(54) SYSTEMS AND METHODS FOR PROVIDING CONNECTIVITY BETWEEN TWO OR MORE HARDWARE AND SOFTWARE COMPONENTS

(71) Applicant: Thales Holdings UK Plc, Reading (GB)

(72) Inventors: James Williams, Reading (GB); Louis Simpson, Reading (GB); Simon Morris, Reading (GB)

(73) Assignee: THALES HOLDINGS UK PLC, Reading (GB)

( * ) Notice: Subject to any disclaimer, the term of this patent is extended or adjusted under 35 U.S.C. 154(b) by 0 days.

(21) Appl. No.: 17/253,442

(22) PCT Filed: Jun. 7, 2019

(86) PCT No.: PCT/GB2019/051582
§ 371 (c)(1),
(2) Date: Dec. 17, 2020

(87) PCT Pub. No.: WO2019/243776
PCT Pub. Date: Dec. 26, 2019

(65) Prior Publication Data
US 2021/0255982 A1    Aug. 19, 2021

(30) Foreign Application Priority Data

Jun. 21, 2018    (GB) .................................... 1810205

(51) Int. Cl.
*G06F 13/40* (2006.01)
*G06F 9/50* (2006.01)

(52) U.S. Cl.
CPC ........ *G06F 13/4027* (2013.01); *G06F 9/5005* (2013.01)

(58) Field of Classification Search
CPC .............. G06F 13/4027; G06F 9/5005; G06F 2209/506; G06F 9/5061; H04L 41/0823; H04L 67/34; H04L 67/38
See application file for complete search history.

(56) References Cited

U.S. PATENT DOCUMENTS

| 5,726,984 A | 3/1998 | Kubler |
| 2008/0086385 A1 | 4/2008 | Chessell |

(Continued)

FOREIGN PATENT DOCUMENTS

| CN | 105630578 | 6/2016 |
| WO | WO 2017/123674 | 7/2017 |

OTHER PUBLICATIONS

GB Search Report for corresponding Application No. GB1810205.3, dated Dec. 6, 2018—5 pages.

(Continued)

*Primary Examiner* — Sisley N Kim
(74) *Attorney, Agent, or Firm* — Dority & Manning, P.A.

(57) ABSTRACT

A computer implemented method of providing connectivity between two or more primary assets, each primary asset comprising a hardware component or a software component, the method comprising receiving a request to provide connectivity between the primary assets; accessing a repository that stores a list of assets and metadata associated with each asset; using the metadata in the repository to generate an hierarchical list of assets; rationalising the hierarchical list of assets by selecting a group of assets from the hierarchical list of assets to be used in providing connectivity between the primary assets; and generating, based on operating parameters of each asset in the group of assets, a deployment plan for the group of assets, wherein the deployment plan defines settings and/or connections to be used between the assets in (Continued)

the group of assets in order to provide connectivity between the two or more primary assets.

20 Claims, 16 Drawing Sheets

(56) References Cited

U.S. PATENT DOCUMENTS

| | | | |
|---|---|---|---|
| 2008/0178147 A1* | 7/2008 | Meliksetian | G06F 8/36 |
| | | | 717/107 |
| 2014/0222496 A1* | 8/2014 | Flores | G06Q 10/0635 |
| | | | 705/7.28 |
| 2015/0304169 A1* | 10/2015 | Milman | H04L 63/0209 |
| | | | 709/220 |
| 2017/0185594 A1* | 6/2017 | Schulz | G06Q 10/06 |
| 2017/0274281 A1 | 9/2017 | Vandonkelaar | |

OTHER PUBLICATIONS

PCT international Preliminary Report on Patentability for corresponding PCT Application No. PCT/GB2019/051582, dated Dec. 22, 2020, 14 pages.
George et al., The Army Aviation Collective Training Solution: AVCATT-A, Dec. 31, 2000, 12 pages.
International Search Report for corresponding PCT Application No. PCT/GB2019/051582, dated Aug. 26. 2019, 2 pages.

* cited by examiner

| | |
|---|---|
| General Asset Management | Asset unique identifier<br>Asset version unique identifier<br>Asset general type |
| Asset properties | Name<br>Description<br>Physical location<br>Version<br>Software Artefact location(s)<br>Workflow data<br>Basic capability codes<br>Number available<br>Status |
| Asset requirements | Hardware platform type<br>Security classification<br>Operating systems<br>Network connection(s)<br>Supporting assets/components<br>CPU cores<br>Memory needed for startup/execution<br>Storage capacity consumed<br>Persistent storage required<br>Supporting data (e.g. files / databases)<br>Operating system patch level<br>Hardware interfaces |
| Asset capabilities | Functions provided<br>Protocols supported<br>Data format support |
| Asset constraints | License details<br>Security requirements<br>Authorised locations<br>Authorised users<br>Known incompatibilities |
| Planning support data | Is plannable asset<br>Effect of asset<br>Functions supported<br>Actions supported<br>Preconditions<br>Preferred<br>Basis cost |
| Measured data | (Multiple types) |
| Cost data | (Multiple types) |

Fig. 2

| Converter | Network connection cost | First Protocol | Second Protocol | Cost of protocol conversion | Total cost |
|---|---|---|---|---|---|
| 1 | 7 | W | Y | 8 | 15 |
| | | W | Z | 1 | 8 |
| | | X | Y | 8 | 15 |
| | | X | Z | 8 | 15 |
| | | Y | Z | 3 | 10 |
| 2 | 9 | W | Y | 8 | 17 |
| | | W | Z | 1 | 10 |
| | | X | Y | 8 | 17 |
| | | X | Z | 8 | 17 |
| | | Y | Z | 3 | 12 |

Fig. 6

SYSTEMS AND METHODS FOR PROVIDING CONNECTIVITY BETWEEN TWO OR MORE HARDWARE AND SOFTWARE COMPONENTS

CROSS-REFERENCE TO RELATED APPLICATIONS

This application is national phase application of International Patent Application No. PCT/GB2019/051582, filed on Jun. 7, 2019, which, in turn, is based upon and claims the right of priority to GB Patent Application No. 1810205.3, filed on Jun. 21, 2018, the disclosures of both of which are hereby incorporated by reference herein in their entirety for all purposes.

FIELD

Embodiments described herein relate to systems and methods for providing connectivity between two or more hardware and software components.

BACKGROUND

With the growth of the internet of things (IoT) and ever greater demand for networked computing devices, there is a growing need to establish connectivity between arbitrary sets of hardware and software components. Such components may not have been designed with the goal in mind of connecting to each other, and so finding a solution that allows for interfacing and transfer of data between these components can often be a complex task.

One example of this can be found in the field of networked training events, in which multiple users seek to interact with one another in a training environment that may be partially or entirely simulated. In one example, a training event may be carried out in which a group of users interact with one another through use of one or more simulators. The various individuals may be allocated their own simulators, with each one simulating the movement of a particular vehicle in the environment. Each simulator may comprise a control panel, which may be designed to closely resemble that of a specific vehicle, and a screen that displays a computer-generated view of the vehicle's external environment. The users are able to control the motion of their respective vehicles by use of the control panel, with the screen display being updated in accordance with the user commands so as to reflect the movement of the vehicle in the external environment. In some cases, training instructors or other personnel may also interact with the users in the environment by introducing computer-generated entities into the simulated environment, these entities being displayed on the screens of the respective users' simulators and serving to emulate the manoeuvres of other vehicles in the real world.

Setting up and running a multi-user simulation event is a non-trivial task, however. In order for the simulation to run effectively, it is necessary to provide continual, real-time exchange of motion data between the various users' simulators, such that the view on each user's display screen can be updated to reflect not just the movement of their own vehicle, but of the other users in the same training environment. The simulators must be provided with the necessary hardware and software to facilitate this data exchange. The complexity is further increased if the simulators themselves are located at different sites from one another, requiring a networked solution to allow the transfer of data between them.

Typically, when faced with the task of configuring the necessary hardware and software components to enable such an event, an ad-hoc solution will be found, with technical staff analysing the operating specifications of the individual components and finding a solution that provides the necessary connectivity for the task in hand. In some cases, the various components involved may have no prior knowledge of one another, and will not have followed the same interface standards for exchanging the necessary data. Given the complexity involved in establishing connectivity between devices, the solution that is chosen will often be one that simply works, rather than one which is particularly optimal. Moreover, since each task may be run as a one-off event, the manual process of configuring the various components must be repeated each time a new assortment of components is presented. The same problem is present in any instance where multiple components are required to connect with one another, in a way that has not previously been done so.

It is desirable, therefore, to provide an improved means for facilitating interconnectivity between different hardware and software components, particularly, but not exclusively, when implementing multi-user simulation events in which a plurality of users, controlling different vehicle simulators, are able to interact with one another in the same simulation environment.

SUMMARY

According to a first aspect of the present invention, there is provided a computer implemented method of providing connectivity between two or more primary assets, each primary asset comprising a hardware component or a software component, the method comprising:
receiving a request to provide connectivity between the primary assets;
accessing a repository that stores a list of assets and metadata associated with each asset, each asset comprising a hardware or software component, wherein the metadata associated with each asset specifies operating parameters for the asset and support requirements for the asset;
using the metadata in the repository to generate an hierarchical list of assets, wherein a first level in the hierarchy comprises the primary assets, and each subsequent level in the hierarchy specifies one or more additional assets that are capable of meeting support requirements of the assets in a preceding level of the hierarchy;
rationalising the hierarchical list of assets by selecting a group of assets from the hierarchical list of assets to be used in providing connectivity between the primary assets; and
generating, based on the operating parameters of each asset in the group of assets, a deployment plan for the group of assets, wherein the deployment plan defines settings and/or connections to be used between the assets in the group of assets in order to provide connectivity between the two or more primary assets.

In some embodiments, in the event the selected group of assets contains two or more additional assets that cannot be connected to one another directly, the method comprises identifying a bridging asset to provide an interface between those assets.

In some embodiments, the step of rationalising the hierarchical list of assets comprises identifying one or more of the assets in the hierarchical list as being redundant in view of other asset(s) already identified as providing the necessary support requirements. In generating the deployment plan, the one or more redundant assets may be excluded from the deployment plan.

In some embodiments, the assets in the hierarchical list that are to be included in the group of assets are selected by considering one or more cost(s) associated with using each asset in the hierarchical list. The cost(s) associated with a respective asset may be stored as cost data in the metadata associated with that asset in the repository.

The cost data associated with an asset may be determined based on one or more of:
 a cost of connecting to a network using the asset;
 a license fee associated with use of the asset;
 compute requirements for the asset;
 a start-up time for the asset.

Each cost associated with an asset may be weighted by a respective weighting factor.

In some embodiments, the request to provide connectivity between the two or more primary assets specifies one or more connection criteria to prioritise, wherein weighting factors are adjusted based on the connection criteria. The connection criteria that are to be prioritised may include one or more of:
 a speed of the connection;
 the fidelity with which data is transferred between the primary assets;
 minimising computer resource footprint;
 efficient usage of licenses; and
 time required for start-up of the system.

In some embodiments, the asset deployment plan comprises instructions for returning each asset to its initial state, once it is no longer necessary to maintain connectivity between the primary assets.

In some embodiments, the method comprises:
 deploying the assets in accordance with the deployment plan; and
 monitoring a performance of one or more of the assets during their operation.

The method may further comprise updating the metadata associated with the respective asset in the repository to reflect the measured performance.

In some embodiments, the method comprises storing the deployment plan in memory for use in the event that a subsequent request to provide connectivity between the same two or more primary assets is received.

In some embodiments, the method further comprises storing a snapshot of the selected group of assets, wherein upon receiving the subsequent request to provide connectivity between the same two or more primary assets, the method comprises:
 determining an extent to which the asset metadata associated with the assets contained in the stored deployment plan has changed since the deployment plan was created;
 determining, based on the extent to which the asset metadata has changed, whether to use the stored deployment plan to provide connectivity between the assets, and
 in the event it is desired not to use the stored deployment plan, determining, based on the extent to which the metadata has changed, whether to generate a new deployment based on the stored snapshot of the selected group of assets.

In some embodiments, the method further comprises storing a snapshot of the hierarchical list of assets,
 wherein in the event it is determined not to generate a new deployment plan based on the stored snapshot of the selected group of assets, the method comprises:
  determining, based on the extent to which the asset metadata has changed, whether to generate a new deployment based on the stored snapshot of the hierarchical list of assets; and
  in the event it is desired not to use the stored snapshot of the hierarchical list of assets for generating a deployment plan, generating an entirely new deployment plan.

In some embodiments, determining an extent to which the asset metadata associated with the assets contained in the stored deployment plan has changed comprises:
 identifying the changes made to the asset metadata of each asset contained in the stored deployment plan; and/or
 determining the overall number of assets contained within the stored deployment plan for which a change in the asset metadata is identified.

In some embodiments, selecting a group of assets from the hierarchical list of assets comprises comparing the hierarchical list of assets with a list of accessible assets to determine if any of the assets in the hierarchical list are inaccessible. The list of accessible assets may comprise:
 assets that are located at specific location(s) and/or
 assets for which a license is available and/or
 assets for which a user has security clearance.

In some embodiments, the request to provide connectivity between the primary assets specifies a time period during which connectivity is required, and the method further comprises:
 retrieving scheduling information specifying a time(s) at which each one of the assets in the hierarchical list of assets is scheduled to be in use; and
 determining whether one or more assets that are contained in the hierarchical list of assets and which it is desired to include in the deployment plan are unavailable during the time period as a result of having already been scheduled for use in that period.

In some embodiments, in the event that it is desired for an asset in the hierarchical list of assets to be included in the deployment plan, but the desired asset is determined to be unavailable during the time period, a determination is made as to whether an alternative asset can be used to perform the role of the desired asset, so as to enable the desired asset to be made available during the time period.

In some embodiments, the method comprises:
 retrieving an earlier deployment plan in which the desired asset has been scheduled for use during the time period, and in view of which the desired asset is unavailable for inclusion in the present deployment plan;
 retrieving details of an earlier request that has led to generation of the earlier deployment plan; and
 re-evaluating the earlier request in tandem with the present request, so as to generate a new asset deployment plan for the earlier request and a new deployment plan for the present request.

The earlier deployment plan may be one that has been generated for a particular phase of a first event specified in the earlier request, the first event comprising two or more phases, each phase having its own respective deployment plan. In the event that the earlier deployment plan event references a subset of assets contained in the deployment plan(s) for one or more of the other phases of the first event, the generation of the new deployment plan for the earlier request may be carried out subject to the condition that the new deployment plan should still reference the same subset of assets contained in the deployment plan(s) for the one or more other phases of the first event.

In some embodiments, the method comprises:

receiving two or more requests to provide connectivity between two or more primary assets, the two or more requests each specifying a respective time period during which connectivity is required;

wherein in the event that the time periods specified in the two requests overlap with one another, the method further comprises evaluating the two requests in tandem with one another, so as to provide a respective deployment plan for each request. In some embodiments, the request to provide connectivity between the two or more primary assets specifies an event having two or more phases, the method comprising generating a respective asset deployment plan for each phase of the event. In some embodiments, the phases comprise a first phase and a second phase, and the deployment plan for the first phase comprises a subset of the assets that are selected for use in the second phase.

In some embodiments, each primary asset comprises a vehicle simulator or a computer control station, each primary asset having a control panel for inputting commands and a display screen. The deployment plan may comprise settings and/or connections to be used for generating a shared simulation environment for users of the simulators and/or computer control stations. The shared simulation environment may comprise image data to be displayed on the display screen of each primary asset. The image data that is displayed on each display screen may be updated to reflect commands input by the users in their respective control panels.

In some embodiments, in advance of generating the final deployment plan, a test deployment plan is generated, the test deployment plan comprising a group of assets that when connected will facilitate testing of operation of the simulation environment.

In some embodiments, the asset metadata for one or more assets used in the test deployment plan is updated in response to testing of the simulation environment, the final deployment plan being generated using the updated metadata.

According to a second aspect of the present invention, there is provided a computer-implemented method comprising:

transmitting, from a client terminal to one or more servers, a request to provide connectivity between two or more primary assets, each primary asset comprising a hardware component or a software component, wherein the one or more servers are configured to:

receive the request to provide connectivity between the primary assets;

access a repository that stores a list of assets and metadata associated with each asset, each asset comprising a hardware or software component, wherein the metadata associated with each asset specifies operating parameters for the asset and support requirements for the asset;

use the metadata in the repository to generate an hierarchical list of assets, wherein a first level in the hierarchy comprises the primary assets, and each subsequent level in the hierarchy specifies one or more additional assets that are capable of meeting support requirements of the assets in a preceding level of the hierarchy;

rationalise the hierarchical list of assets by selecting a group of assets from the hierarchical list of assets to be used in providing connectivity between the primary assets; and generate, based on the operating parameters of each asset in the group of assets, a deployment plan for the group of assets, wherein the deployment plan defines settings and/or connections to be used between the assets in the group of assets in order to provide connectivity between the two or more primary assets;

the method further comprising:

receiving, at the client device, a copy of the deployment plan from the one or more servers; and configuring one or more of the primary assets in accordance with the details specified in the deployment plan.

According to a third aspect of the present invention, there is provided a computer system configured to carry out a method according to the first aspect or second aspect of the present invention.

According to a fourth aspect of the present invention, there is provided a system comprising:

two or more simulators; and one or more servers configured to perform a method according to the first or second aspect of the present invention;

wherein the primary assets include at least two of the simulators, and the deployment plan generated by the one or more servers comprises settings and connections to be used between the assets in the group of assets, in order to generate a shared simulation environment for users of the simulators.

The request to provide connectivity between the simulators may be received from at least one client device associated with one of the simulators.

According to a fifth aspect of the present invention, there is provided a computer readable storage medium comprising computer executable instructions that when executed by one or more computers will cause the one or more computers to carry out a method according to the first or second aspect of the present invention.

BRIEF DESCRIPTION OF DRAWINGS

Embodiments of the invention will now be described by way of example with reference to the accompanying drawings in which:

FIG. 2 shows an example of asset metadata stored in an asset metadata repository in an embodiment;

FIG. 6 shows cost data for two protocol converters as stored in the asset metadata repository, according to an embodiment;

DETAILED DESCRIPTION

Embodiments as described herein facilitate ease of connection between different hardware and software components. A repository is used to store metadata associated with different assets, providing details of the operating parameters and support requirements of each asset. Upon receiving a request to provide connectivity between two primary assets, the repository can be used to generate a list of additional, supporting assets that can be used to provide the necessary connectivity between those two primary assets. In some embodiments, the choice of which supporting assets to use, and which parameters to select in providing connectivity can be weighted towards achieving different goals; for example, speed of connection, or minimisation of bandwidth or memory requirements, etc.

It will be understood that by "providing connectivity" between the primary assets, embodiments as described herein enable inter-operability between those assets. That is, embodiments serve to ensure that the necessary hardware and/or software interfaces are available and in place to allow for the exchange of data between the primary assets.

Figure 1:
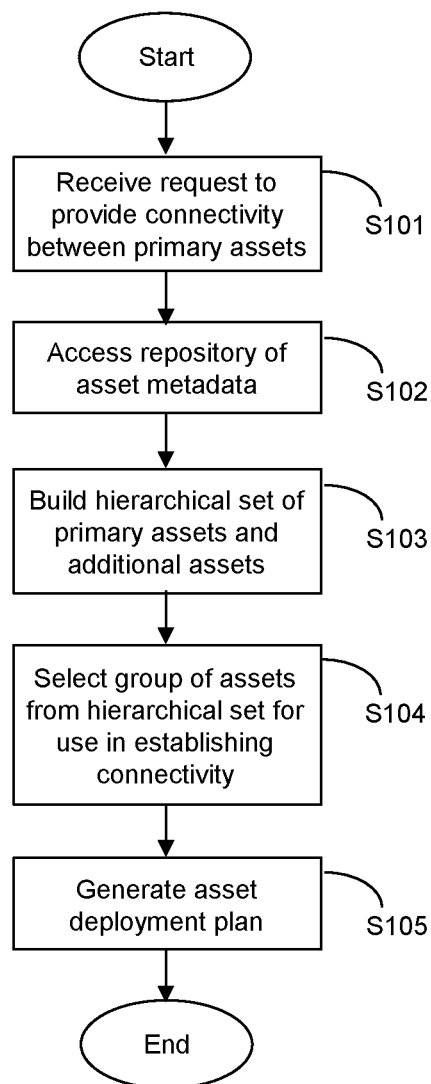
FIG. 1 shows a flow chart of a method according to an embodiment.

FIG. 1 shows a flow-chart of a method in a first embodiment. The method commences upon receipt of a request at a server to provide connectivity between two or more primary assets (step S101) that comprise hardware and/or software components.

Upon receipt of the request, the server accesses a repository of asset metadata to determine which additional hardware and/or software components are required to provide the necessary connectivity (step S102).

The repository itself comprises a table of assets, and a set of metadata for each asset. FIG. 2 shows an example of the asset metadata as stored in the repository for an individual asset. As shown in FIG. 2, the asset metadata is broken down into a number of sub-categories:

General asset management: Specifies the type of asset (hardware/software), together with a unique identifier for the asset and the particular version of the asset. The unique identifier may provide a general record for tracking a particular asset, regardless of the precise version. The version specific unique identifier meanwhile may be used to record a specific version of the asset, separate from any other identifier so as to make the record in the asset repository agnostic of the asset's own versioning scheme.

Asset properties: Specifies further details of the asset, including its name, location, the number of assets of this type available (as determined by the number of licenses available, for example, or simply the number of physical instances of the asset), and the asset status (e.g. active/inactive, booked for use at a particular date, quarantined etc.) In the case of a physical hardware device, the location may simply be the site at which the device is situated. In the case of a software component, the location may indicate a server or domain address at which that software can be accessed. The basic capability codes may comprise values indicating what the asset can do e.g. "protocol converter", "computer generated force (CGF) generator" etc. An individual asset may have a number of different such capabilities.

Asset requirements: Specifies operational requirements for the asset, including its security classification, operating systems with which the asset is compatible, the network connections available and hardware interfaces. The asset requirements further specify other assets (supporting assets) that are required for the present asset to function. The supporting assets may be generic ones i.e. assets identified based on type/capability, or specific ones i.e. assets having a particular ID, which are necessary for the present asset to function.

The asset requirements further specify details of memory needed for startup and/or execution of the asset, the required storage capacity and persistent storage, the minimum patch level for any operating system on which it is intended for the asset to run, and any other files and/or databases that must be accessed in order for the asset to perform its function.

Asset capabilities: Specifies functions provided, the protocol(s) and data format(s) supported by the asset.

Asset constraints: Specifies any limits on use of the asset, including license details, security provisions, authorised users and locations, and any known incompatibilities (e.g. with other assets).

Planning support data: Specifies properties of the asset that may be used to guide the planning related processes of creating the hierarchical list of assets and generating a deployment plan.

Measured data: Comprises data obtained by feedback from past use of the asset. As explained in more detail below, the performance of an asset may be monitored during its deployment and used to provide a more accurate determination of the asset's various operating requirements. This is relevant when one considers that some of the asset metadata stored in the repository will be provided by a third party, such as the original supplier of that asset. The values quoted by that supplier for different properties (e.g. memory needed for startup and/or execution of the asset, the required storage capacity and persistent storage) may not accurately reflect the true operating requirements of the asset, however; the actual operating requirements may only become apparent during use of the asset, and may vary depending on a host of other factors, including which other assets are being used in conjunction with the asset. By monitoring the actual performance of the asset during its deployment in different circumstances, it is possible to validate the values provided by third parties, and where appropriate, to update the values stored in the asset metadata to reflect the true requirements of the asset.

Cost data: Specifies details of costs associated with use of the asset. The cost data may provide a means for weighting different aspects of asset performance or requirements, so as to provide a basis for selecting certain asset(s) over others, and/or selecting certain properties of an individual asset over other properties. As one example, in the event that an asset supports multiple network protocols, the cost data may specify a cost for each protocol, with the cost being based on the bandwidth usage associated with the respective protocol; in another example, the cost associated with a particular protocol may be based on how widespread are devices that also support the same protocol. The cost data may be input manually and updated at intervals. In some embodiments, the cost data may be updated based on the monitored performance of the asset during its deployment.

As discussed above, the metadata associated with a particular asset specifies which other assets are required for the asset to run and/or depend on that asset. In this way, the repository can be used to identify assets that are either explicitly or implicitly linked with one another, as well as their subsidiary assets and supporting objects. By analysing the metadata associated with the primary assets contained in the request, it is possible to generate a hierarchical dataset of assets that defines, in addition to the primary assets, any required underlying objects that host, support and link these assets (step S103 of FIG. 1).

In an example, by analysing the metadata associated with the primary assets, the system may be able to infer the need for a network infrastructure, which may in turn imply requirements for connectivity including network tunnels and security devices and processes (e.g. firewall settings, network infrastructure security filters, process whitelists etc). Establishing such tunnels and security devices may require specific packages with supporting settings which in turn will imply the establishment of machines with specific properties.

Figure 3:
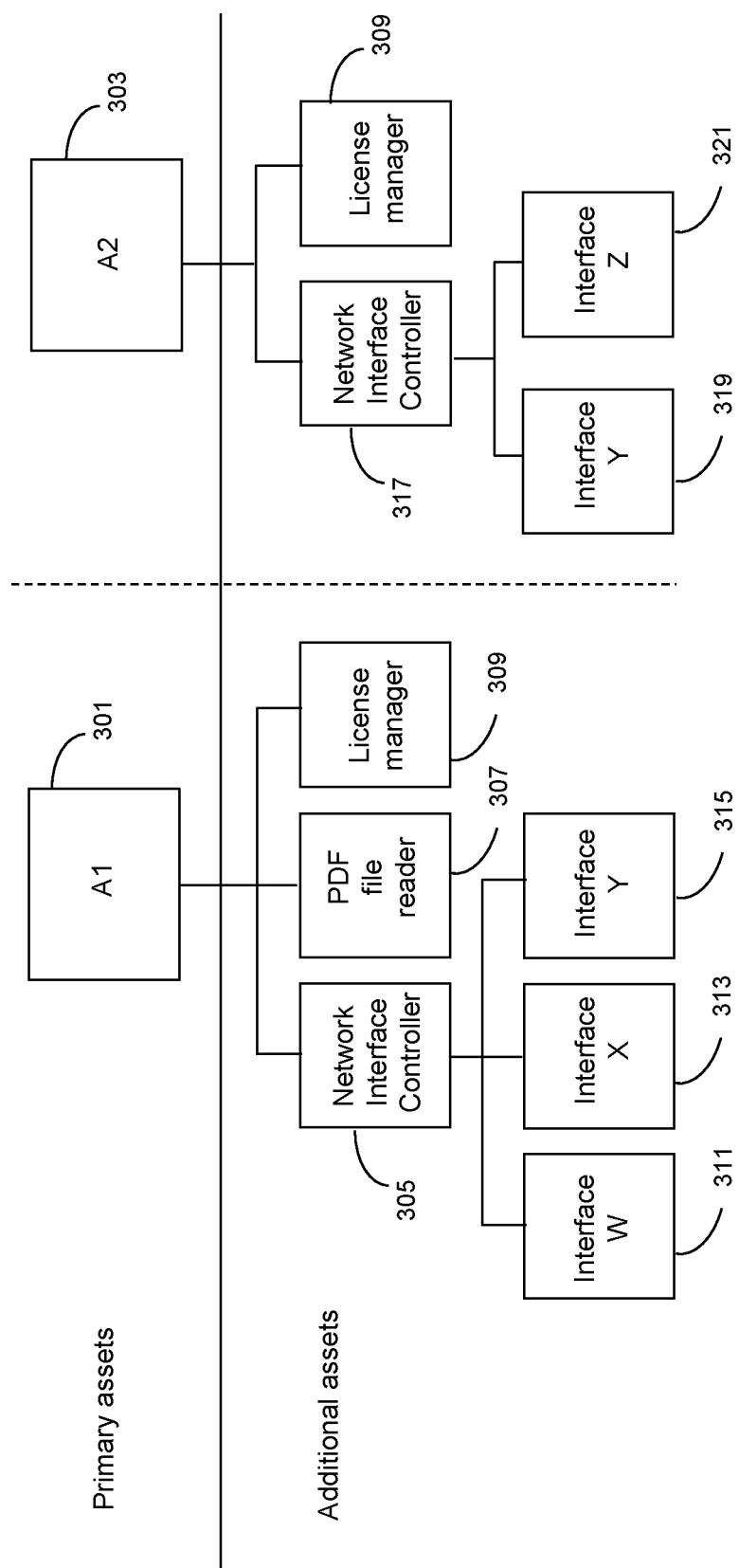
FIG. 3 shows an example of a hierarchical list of assets according to an embodiment.

FIG. 3 shows an example of the generation of the hierarchical dataset of assets. In this example, a request is received to provide connectivity between two primary assets, A1 (301) and A2 (303). Upon retrieving the metadata associated with the first primary asset A1 from the metadata repository, it is determined that A1 requires supporting assets in the form of Network interface controller 305, PDF file reader 307 and License Manager 309. Each of these supporting assets has its own information stored in the asset metadata repository. Retrieving the metadata for the network interface controller shows that this component links to one of several network interfaces W (311), X (313) and Y (315), each of which again has its own entry in the asset metadata repository. In a similar way, the asset metadata for the second primary asset A2 is retrieved and used to determine those supporting assets that are necessary for the asset A2 to function. The supporting assets for primary asset A2 include a Network interface controller 317 and the same license manager 309 as was the case for the first primary asset A1. In this case, the Network interface controller 317 associated with primary asset A2 links to network interfaces Y (319) and Z (321). Thus, by accessing the entries in the asset metadata repository for the two primary assets A1, A2, it is possible to generate a hierarchical list of assets, whereby each asset in the set links back to the layer immediately preceding it.

Referring again to FIG. 1, once the initial hierarchical dataset of assets has been created by analysing the metadata in the repository, a group of assets to be used in establishing connectivity between the primary assets is selected from the dataset (step S104), by performing a rationalisation process. The initial list of assets in the hierarchical dataset of assets may include multiple demands for items for which a single instance may be reused. In a first part of the rationalisation process, therefore, the list of assets in the initial hierarchical dataset may be "pruned" by replacing multiple duplicates of an asset with one instance or merging multiple individual small resources with a combined version of suitable size to support the overall demand. By doing so, the rationalisation process serves to reduce multiple instances of a shareable resource to an appropriate scale.

A second part of the rationalisation process may involve determining the best fit of the assets into a plan for deployment. In doing so, priority may be given to one or more criteria, such as the need to optimise the speed of connection, fidelity, minimum computer resource footprint, most efficient use of application licenses, fastest start-up time, etc. Each of these criteria may be afforded a particular weighting, which may be included within the request as provided at the outset. As an example, in the event that priority is given to start-up performance, it may be decided that multiple virtual machines (VMs), each one with a single application, should be instantiated. In another example, if it's decided that the priority is for minimal operating system licenses, it may be decided that all applications should be combined into a single large VM, except where the resource weight or incompatibility forces some applications to be placed onto separate VM.

A further stage of the rationalization process may involve identifying all expected processes and connectivity requirements, which allows for tailored security settings to be applied in subsequent stages (examples: firewall settings, network infrastructure security filters, process whitelists). The rationalisation process may involve multiple iterations to resolve the best selection of assets from the initial hierarchical dataset.

The output from the rationalisation process will comprise a modified dataset that contains details of the items and resources that will be required to establish the desired configuration of the (primary) assets. The modified dataset describes the assets to be used, their relationships and the frameworks to support them, such as resource definitions. The dataset may be used for a number of purposes, including:

Supporting a scheduling process by allowing the best time to be selected when the identified resources will be available Supporting a check process that the demand for assets and resources is practical or achievable Identifying resource shortfalls to be identified and resolved e.g. acquiring additional licenses or hardware Confirming that the resources for the event are not currently in use and that immediate capacity exists The outcome of the test process will depend on the purpose it is being used for and may including report generation or function inhibition. During this stage, asset metadata relating to licenses may be reviewed to confirm availability to support deployment.

Figure 4:
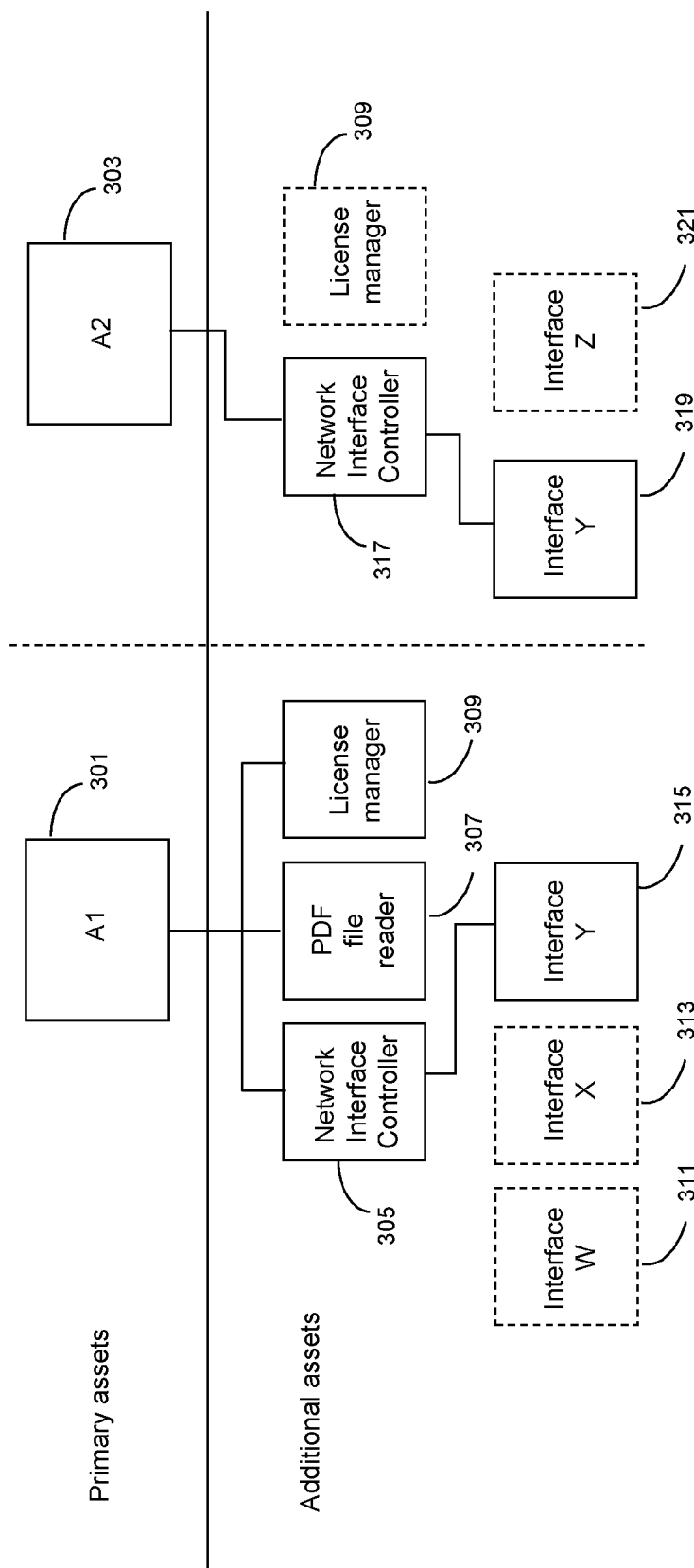
FIG. 4 shows an example of a rationalisation process being applied to the hierarchical list of assets as shown in FIG. 3.

FIG. 4 shows an example of how the rationalisation process may be applied to the dataset of FIG. 3. Since both primary Assets A1 and A2 require use of the same license manager 309, only a single version of the license manager need be instantiated. Accordingly, the copy of the license manager retrieved for primary asset A2 is pruned from the dataset; this is shown pictorially in FIG. 4 through the use of dashed lines. Similarly, in this case, it is determined that the interfaces W, X and Z are also not required, since the two primary assets share a common interface Y.

Figure 5:
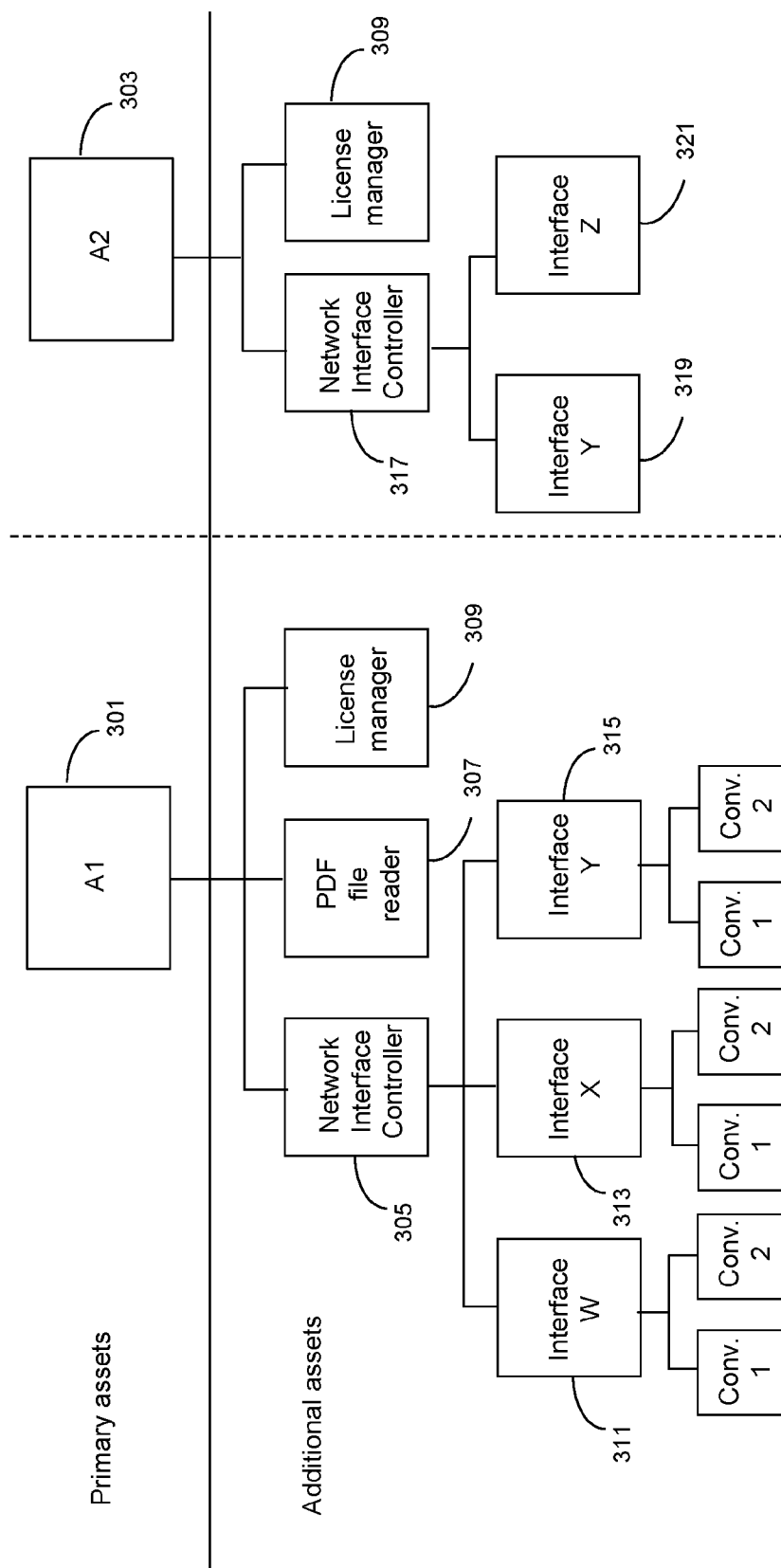
FIG. 5 shows a further example of a hierarchical list of assets according to an embodiment.

An example of how different selection criteria might be applied as part of the rationalization process will be described with reference to FIGS. 5 to 8. FIG. 5 shows the same hierarchical set of assets as shown in FIG. 4, with the added feature that the metadata for each network interface W, X, and Y also specifies compatible protocol converter(s) for converting the respective protocol to one or more other protocols, in order to achieve interoperability between devices. It is to be noted that, in some instances, whilst both assets may share a common interface On the example of FIG. 4, interface Y is common to both asset A1 and asset A2), there may be cost implications associated with that interface that make it preferable to select an alternative pair of interfaces, even with the added cost of the protocol converter to convert between the two protocols. In the present example, the metadata for each interface W, X, Y specifies the same pair of protocol converters, converter 1 and converter 2 (depicted as Conv 1 and Conv 2 in FIG. 5).

The protocol converters are themselves assets, each one having its own metadata stored in the asset metadata repository. The asset metadata for both of the protocol converters includes cost data specifying a cost for use of the asset. As discussed earlier, the cost data may be manually entered and updated in the asset metadata repository and can be adapted to place greater or less emphasis on different aspects of performance.

The cost data for the two protocol converters is summarised in the table of FIG. 6. The cost data itself comprises two parts: the first cost is for the use of the converter per se, and the second cost defines the cost of converting between a particular pair of protocols. In the case of converter 1, there is a network connection cost of 7, and additional costs of protocol conversion for the different pairs of protocols W→X, W→Z, X→Z, etc. The same also applies in respect of converter 2. In the present example, converter 2 carries a higher cost of 9 for network connection, but the cost of protocol conversion for each pair of protocols is the same as that for converter 1. The total cost for each option comprises the sum of the network connection cost for the converter, and the individual cost for the particular pair of protocols.

Figure 7:
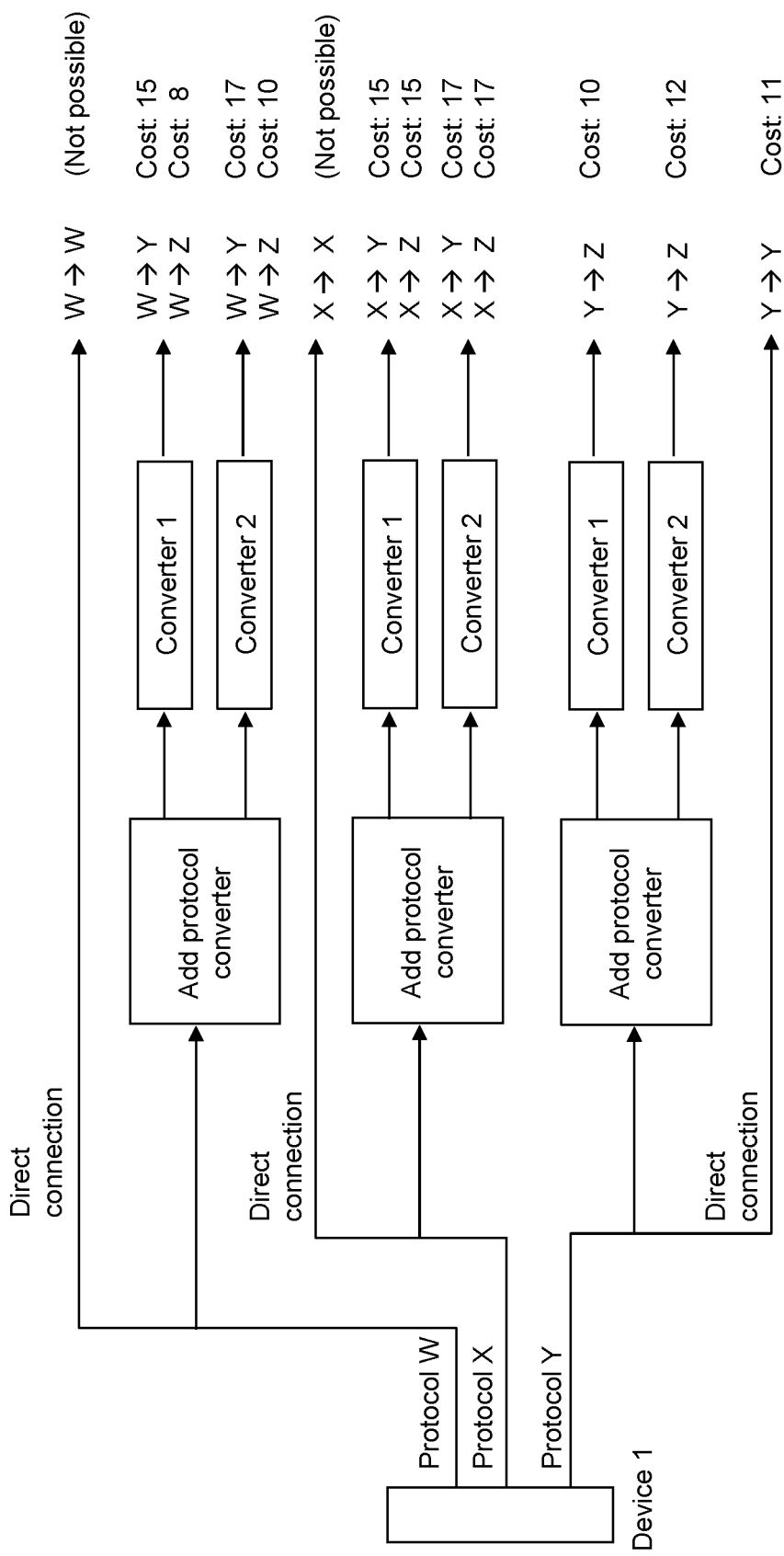
FIG. 7 shows a decision tree for selecting which assets from the hierarchical list of assets shown in FIG. 5 are to be included in an asset deployment plan.
Figure 8:
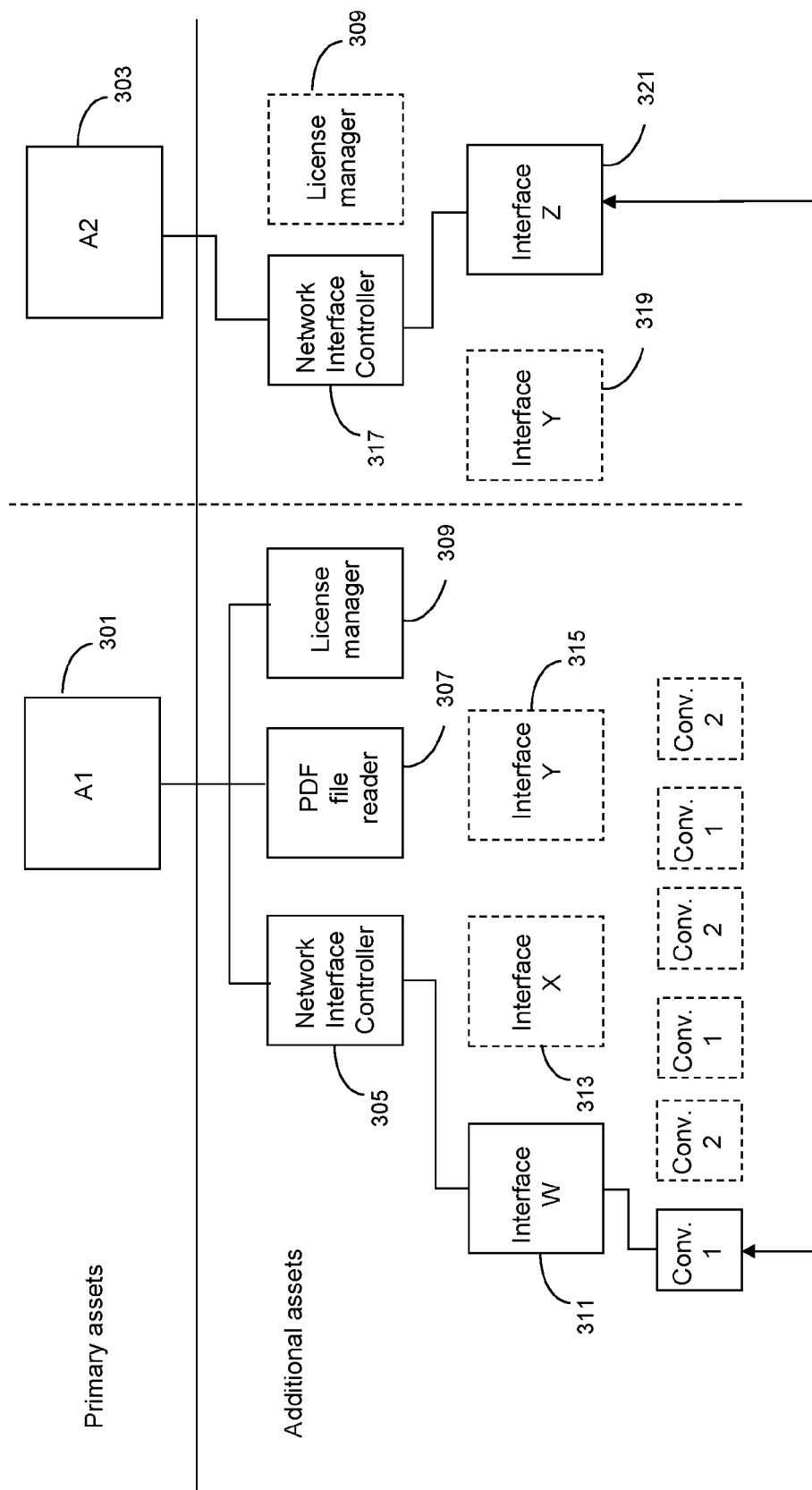
FIG. 8 shows an example of a rationalisation process being applied to the hierarchical list of assets as shown in FIG. 5.

FIG. 7 shows the decision tree used to select which of the interfaces W, X, and Y is to be selected for the deployment plan, and which of the two protocol converters is to be employed. In this example, although a direct connection between the two primary assets is available through use of the common interface Y, the cost associated with that option (11) actually exceeds that which is available through other options. Specifically, if using converter 1 to convert from protocol W to protocol Z, a reduced cost of 8 can be achieved. Similarly, if using converter 2 to perform the same conversion, a cost of 10 can be achieved. Thus, even with the addition of the protocol converter, an overall reduced cost for connection can be achieved compared to the direct correction available using interface Y. Since converter 1 provides a further reduction in cost compared to converter 2, in this case it makes sense to select converter 1 for the asset deployment plan; this is shown pictorially in FIG. 8, where the set of assets as generated in FIG. 5 has now been rationalised to only include the final set of assets required for the deployment plan. Assets that are not selected for the deployment plan are depicted in dashed lines.

It will be understood that, in the event that two assets are required that do not share the necessary commonality in their properties, a bridging element may be identified that can provide an interface between those two assets. For example, with reference back to FIG. 4, in the absence of a common interface Y between the two assets, the protocol converter(s) would provide such a bridging element.

It will further be understood that the values for the cost data as shown in FIGS. 6 and 7 are provided purely by way of example. In practice, the cost data for an asset may be obtained as a sum of costs for different aspects of performance (e.g. total memory requirements, bandwidth required for data transfer etc.). The cost for each individual aspect of performance may be weighted according to how important that aspect of performance is deemed to be when establishing connectivity between the primary assets. The absolute values for each cost, as well as the weightings associated with each cost, may be updated over time. In addition, or alternatively, the weightings may be updated directly in response to information contained within the request to establish connectivity between the assets. For example, if it is specified that speed of data transfer is a fundamental requirement for the connection, then the cost(s) of features that provide a high bandwidth connection may be given a smaller weighting than in other cases.

Having carried out the rationalisation process, the system next uses the selected assets to generate an asset deployment plan (step S105 of FIG. 1). In more detail, once the group of assets to be used in the deployment plan is finalised, a full set of instructions is generated describing what is to be implemented and how in order for the connectivity to be established (step S105). The instructions may take multiple forms and may include:

Template data for cloud orchestration
Software installation scripts
Description for the configuration of physical and virtual computers and network assets
Configuration data for the primary assets
Written instructions to be implemented by personnel Where automated processes are used, such as cloud orchestration, software installation agents, remote management interfaces or equivalent methods, the previously generated instructions are pushed to the appropriate deployment mechanisms. The process of pushing the instructions to the appropriate deployment mechanisms may include one or more of:

Creating and configuring network infrastructure
Configuration of physical equipment
Creation and configuration of virtual machines
Installation and/or configuration of software applications
Copying of databases or similar supporting data
Configuration of access devices A verification mechanism may be used to ensure that all steps in the implementation process have been correctly carried out. The verification process may involve feedback from automated mechanisms or use other methods as appropriate.

In addition to providing the instructions to configure the various assets in such a way as to provide the requested connectivity, the instructions in the asset deployment plan may further be used to reverse the creation process and shutdown, clean up and return the selected group of assets to their initial states. The same mechanism may be used to recover in the event that the connectivity fails to be established, or some form of failure is experienced following connection of the primary assets to one another. While a full teardown and rebuild may be required for certain use cases (e.g. a high security environment) it will usually be preferable to select a mechanism that minimises the time and effort involved. The nature of the asset to be added, removed or reconfigured and the weightings of the different methods available will be used to select the most appropriate methods. This may include concepts such as:

suspend VM vs delete
reconfigure existing VM vs creation of new
reconfigure application vs reinstall
isolation of network vs teardown In some embodiments, where the request for connectivity is scheduled to take place at a defined time and date, the startup performance can be improved by carrying out certain functions ahead of time. For example, pre-processing steps may be carried out overnight when utilisation of assets is low. Such pre-processing steps may include:

Pre staging of data to repositories
Pre-generation of system images

Pre-generation of virtual machines, and suspension of these virtual machines until required Pre-generation of virtual machine snapshots to allow faster creation and bypass of software installation steps during deployment.

Figure 9:
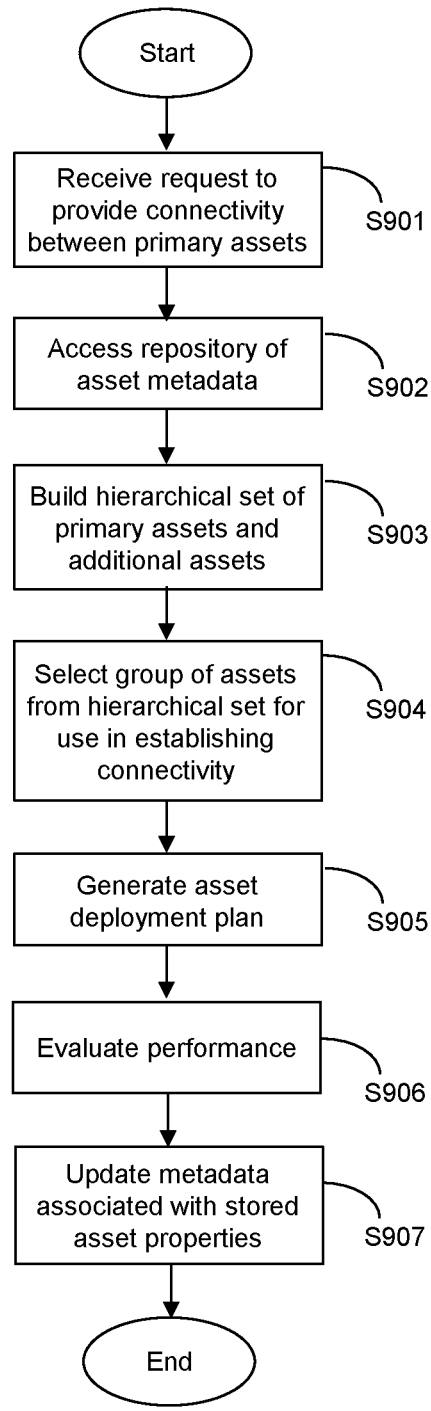
FIG. 9 shows a flow chart of a method according to an embodiment.

As noted earlier, the asset specification as stored in the asset metadata may not accurately reflect actual demand requirements; for example, the memory requirements for a particular asset, as specified in the asset metadata, may be greater than that which is actually required to utilise that asset during a particular training event (this may be the case where the asset metadata has been obtained from a third-party supplier of the asset, for example). In some embodiments, once connectivity is established between the assets and a processing task is carried out, the CPU usage requirements of one or more assets in the deployment plan may be monitored to provide a more accurate measure of that asset's processing/memory requirements. Following determination of the actual requirements of the asset, the metadata for that asset as stored in the repository may be updated to reflect the measured values. This may include updating the cost data for the asset; for example, if the asset is found to have a smaller memory usage than expected, then a value of the cost data that is used to signify the size of the memory requirements may be reduced accordingly. FIG. 9 shows a flow-chart of such an embodiment. Here, steps S901 to S905 are the same as steps S101 to S105 of FIG. 1. In step S906, the performance of one or more assets (for example, their memory usage requirements) is monitored. In step S907, the asset metadata is updated to reflect the actual processing requirements, as determined by monitoring the performance in step S906. By doing so, subsequent requests to provide connectivity between different components can be handled more effectively.

When selecting the group of assets for the asset deployment plan, it may be possible to improve performance by comparing alternative configurations against output datasets achieved by previous asset deployment plans. Evaluation of input values may be required since a simple comparison may be inadequate; some differences in inputs may be unimportant and allow for full reuse of an existing dataset, whilst other differences may allow for a partial reuse or bypassing certain steps in one or more stages of generating the asset deployment plan. As an example, where a request for connectivity is received, and an asset deployment plan already exists from a previous version of that same request, the same underlying assets may be used, but with a different network IP. In another re-run, the same asset plan may be used, but with the underlying asset dependencies being changed.

More generally, data gathered during all stages of generating the asset deployment plan and operation process may be used to automatically update records relating to assets, platforms and the actual task for which connectivity between these components is necessary. Doing so may then allow for processes that may include fault reporting, performance and failure analysis.

In some embodiments, the asset deployment plan for a particular request may be iteratively determined by monitoring the performance achieved when a particular configuration is chosen, updating the metadata based on performance, and repeating these steps until an optimum set of assets/properties is determined.

To support usage-based charging models, records of the utilisation of assets and resources may be maintained in memory. In order to maintain proper tracking of application licences, records of the current allocation of licences to different assets can be similarly stored in memory.

The chosen configuration as specified in the asset deployment plan may be stored and re-used for subsequent requests. For example, the asset deployment plan may be "snapshotted", storing as far as possible the deployed systems and infrastructure, with the snapshots stored for reuse. When a similar request to that used to generate the asset deployment plan is received at a subsequent point in time, the standard creation process used to generate the asset deployment plan can be bypassed and the plan can instead be based on the previously created snapshots plus a configuration stage to apply any settings specific to the instance (example: external network IP addresses, training ID data). Embodiments can thereby simplify the creation of asset deployment plan and shorten their creation time, reducing computational burden when providing connectivity between different assets.

It will be appreciated that the asset deployment plan that is generated in response to a particular request may change over time; that is, even where two identical requests are received a certain time apart, the asset deployment plan that is generated in response to the first request may differ from that which is generated in response to the second request. The difference can be explained by changes in the underlying supporting assets; such changes might refer to the availability of those assets at the particular point in time, as well as updates to their specifications, or the replacement of older versions of assets with new ones. As a result of these changes, the "optimal" asset deployment plan for a given request may vary depending on precisely when that request is received.

In order to accommodate these changes, when receiving a request that is identical to one received previously, a check may be made as to whether there exists a snapshot of an asset deployment plan generated in response to that earlier request. In the event such a snapshot does exist, a further pre-screening step may be carried out in which it is determined whether there have been any changes to the underlying supporting assets in the snapshotted asset deployment plan in the time since it was created. Changes made to an asset made be stored as part of the asset metadata for that asset. In some embodiments, a change may be recorded in a field of the metadata together with an indication of the significance of the change; for example, the change may be specified as being of "minor significance" or of "crucial significance". If the only changes are ones of minor significance, a decision may be made to proceed by using the same asset deployment plan as recorded in the snapshot. However, if more significant changes have taken place, then the decision may be taken to re-run the generation of the asset deployment plan anew. In some examples, the decision to re-run the generation of the asset deployment plan may be taken where no one single asset is recorded as having undergone a change of crucial significance, but the number of assets recorded as having undergone a change of minor significance is still above a predetermined threshold. As an example, a request may require the use of a particular software component that is configured to run on a certain operating system. In the event it is determined that the operating system has been updated with a new security patch, the original snapshot of the deployment plan (specifying the older version of the operating system) will no longer be applicable. However, this can be easily accommodated by revising the earlier asset deployment plan to include the updated operating system.

It will further be appreciated that the snapshots need not be applied to the final asset deployment plan only, but that each step of the process used to generate the asset deployment plan (generation of the hierarchical set of assets, rationalisation of that set of assets, etc). may be independently snapshotted. When carrying out the pre-screening step, a decision may be made as to whether each stage is still valid; for example, if it is determined that the final asset deployment plan is no longer valid, a check may be made if the (snapshotted) set of assets as obtained following rationalisation is still valid. If so, then that set of rationalised assets may provide the starting point for generating the asset deployment plan in response to the present request. If not, then a check may be made if the original (snapshotted) hierarchical data set of assets is still valid. If so, then that hierarchical data set of assets may provide the starting point for generating the asset deployment plan in response to the present request. If not, then it may be necessary to commence the process anew without reliance on any snapshotted data.

Performance metrics may be gathered for billing, security analysis, or other purposes. Embodiments provide the functionality to create, update, manage and delete assets with versioning mechanisms. The asset metadata may be updated, modified, or deleted as different assets come online or go off-line. It is also possible to review scheduled usage data for individual assets that have been allocated to different training events, and to review the level of utilisation of each asset. Authorised users may monitor running training events and their supporting infrastructure. Different levels of fidelity may be available depending on the desired use case from a basic status overview through to detailed diagnostics.

In some embodiments, as part of the rationalisation process used to select the group of assets from the hierarchical dataset, the accessibility of the identified assets may be taken into consideration. For example, the system may store a list of accessible assets and compare this list against the assets contained in the hierarchical dataset in order to eliminate from the selected group of assets ones for which it is not possible to deploy. An asset may be deemed to be "inaccessible" for a number of reasons; these might include, for example, the case where the necessary licences are not available to cover use of the asset, or where security provisions restrict the use of the asset to authorised personnel only. In some cases, a particular asset may require that a certain number of trained personnel are available and on-hand to oversee the running of that asset; for example, if a simulator is being used to train an individual in controlling a vehicle, there may be a requirement for one or more training staff to be available to oversee that training. The number of staff required to oversee use of an asset may be stored within the asset metadata for the asset in question. When rationalising the initial dataset of assets, embodiments may take into account a total number of personnel that are required to be involved. If the number of such personnel is found to exceed a threshold, the selection of assets may be re-evaluated to identify ones that do not require as many people to be involved in the process.

Figure 10:
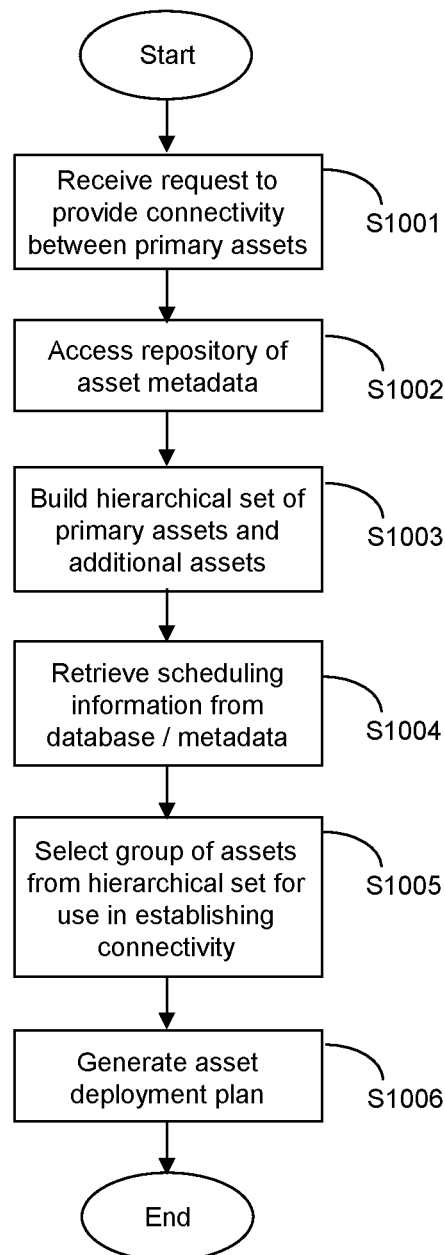
FIG. 10 shows a flow chart of a method according to an embodiment.

A further restriction on the selection of assets may arise from scheduling conflicts. In some embodiments, the list of potentially accessible assets for use at a particular site or in a particular territory may be stored in a database, together with scheduling information that specifies time(s) at which each asset is booked to be in use. Where the request to provide connectivity between the primary assets specifies a time period in which the connectivity is required, the availability of assets in the hierarchical dataset during that time period may be determined by reference to the scheduling information; for example, a particular asset that is present at a particular site, and which would otherwise be selected, may be omitted from the deployment plan. The scheduling information may also be stored as part of the "status" information in the asset metadata repository. FIG. 10 shows an example flow-chart of an embodiment in which the scheduling information is taken into consideration when selecting the group of assets from the initial hierarchical data set. It will be seen that steps S1001 to S1003 of FIG. 10 correspond directly to steps S101 to S103 of FIG. 1, and that steps S1005 and S1006 correspond directly to steps S104 to S105; the additional step S1004 of FIG. 10 then defines the step of consulting the information in the scheduling information in order that the scheduling information will then be taken into account when selecting the group of assets for the deployment plan (step S1005).

It will be appreciated that on occasion, where a request is received to provide connectivity between two or more primary assets for a particular event, there may be certain assets that are identified as being desirable, or even essential to include in the asset deployment plan for that event, but that are deemed to be inaccessible as having been previously booked for another event at the same time. In this case, a global approach may be taken, whereby the request associated with that other event is re-examined in conjunction with the current request, and it is determined whether an alternative configuration for the other event might be used so as to allow the assets in question to become available for use in the current event. That is, the rationalisation process used to identify the group of assets to be deployed for the other event may be repeated, but this time in tandem with carrying out the same process for the current event. The goal will then be to find the best solution that will allow both events to run at the same time, whilst still providing an acceptable configuration (in terms of the predicted performance, or overall cost, etc.) for both cases. Whilst in some cases, the re-evaluation of an existing asset deployment plan may result in a less optimal configuration for that particular event, a decision may be taken that it is preferable to be able to run both events simultaneously using the finite number of assets and resources available, than it is to have to delay or reschedule an event in the interests of providing the most optimal asset deployment plan for any one single event.

It will further be appreciated that the above "global approach" may not only be carried out when there is already an asset deployment plan present from an earlier request. In some embodiments, upon receiving a request to provide connectivity between two primary assets, a waiting period may be implemented, whereby a certain amount of time will be allowed to lapse before formulating an asset deployment plan in response to that request. If, during that period, a further request is received, and that further request is found to have conflicting requirements in terms of the assets required, the requests may be processed in parallel with one another to determine the best asset deployment plan for each event, that will still allow the two events to proceed alongside one another.

In other embodiments, in the event that a particular request for connectivity does not specify a particular time at which connectivity is to be established, it may be possible to identify and output a suggested "best-time period" for establishing connectivity, whereby the assets available at that time (and not scheduled for use elsewhere) provide the most effective selection and configuration of assets for achieving the task in hand.

Figure 11:
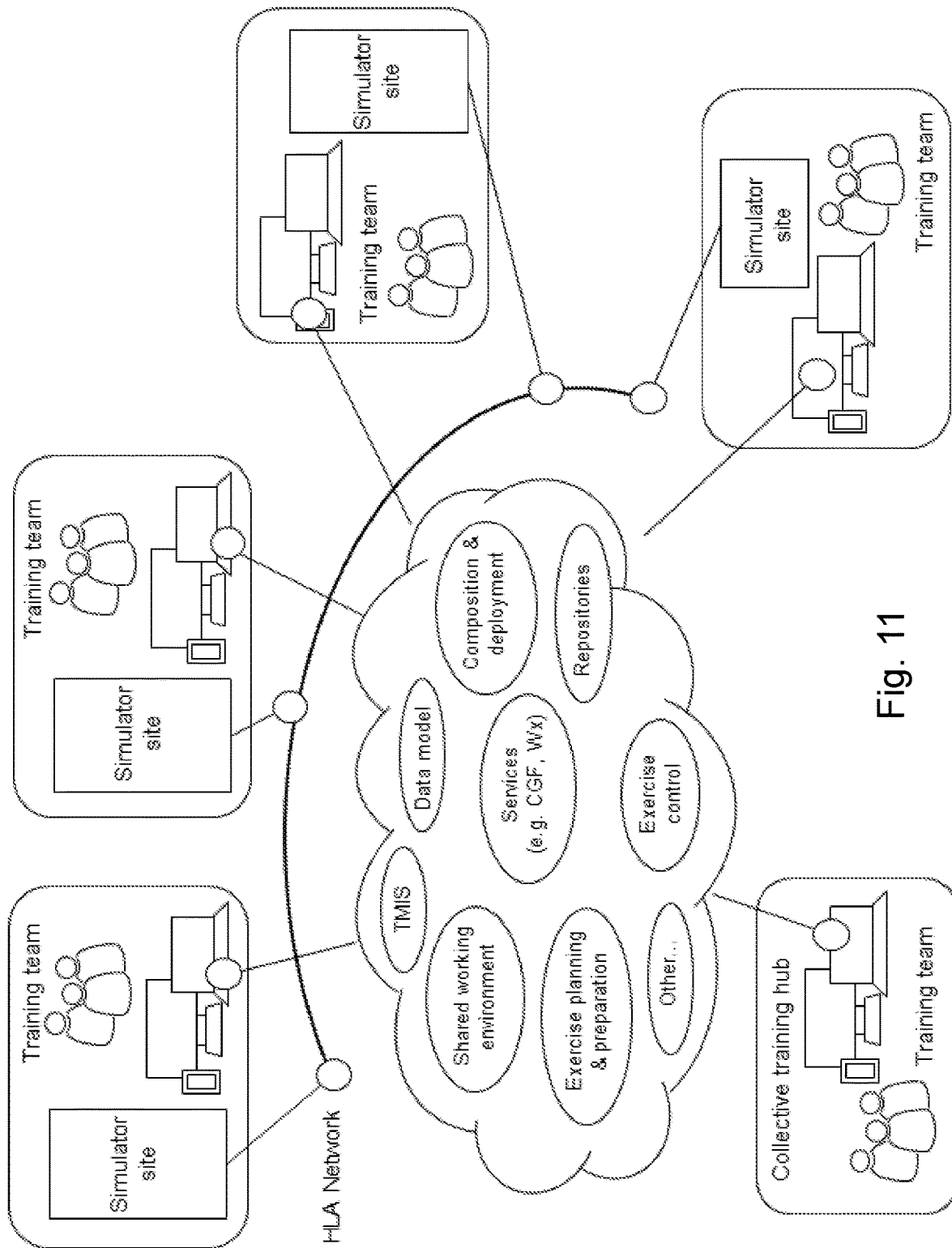
FIG. 11 shows a schematic of a Networked Synthetic Training system according to an embodiment.

An example embodiment will now be described with reference to FIGS. 11 to 13. In this embodiment, steps are taken to configure a system for Networked Synthetic Training (alternatively known as Collective Training). FIG. 11 shows an example of a system to be used for the Networked Synthetic Training. The system comprises a plurality of vehicle simulators, which in the present example are all located at different sites from one another. The simulators may be used to simulate land-based vehicles, such as cars, lorries, buses and tanks, as well as sea-borne vessels and all types of aircraft. The system may also include one or more instructor control panels, and/or separate computing devices carried by personnel stationed at a particular location, such as on a model (or real) battlefield, for example. The Networked Synthetic Training system is established by providing connectivity between the one or more vehicle simulators, instructor control panels, and/or computing devices carried by personnel, such that the users of those devices may participate in a training event in which they interact with one another in a shared simulation environment. The commands and manoeuvres that any individual user performs in their simulator, or at their control panel, are used to update the visual displays seen inside the simulators and at the control panels of the other users, so as to create the perception that the users are all genuinely interacting with one another in the same external environment.

The training event can be thought of as a specific instance of training consisting of assets to deploy, exercise data to include, any settings metadata required to configure the event and data such as description, date, time and duration. As above, the term "asset" is understood to comprise an individual hardware or software component (or combinations thereof). A single event may contain multiple phases each with different assets and settings. During event test and execution it may be possible to access tools and functionality deployed into the event via automatically maintained links.

It will be appreciated that the Networked Synthetic Training system may vary in scale. A small-scale system may incorporate two or three simulators connected together at a single location. A large-scale system may incorporate dozens of simulators connected together across multiple geographical locations, potentially across multiple countries. A smaller scale system may be used to deliver only one training event at any given time, for example. A larger scale system may be used to support the simultaneous delivery of multiple training events for different groups of trainees.

A number of dedicated staff may act to manage and operate the system. For example, there may be subject matter experts who act as instructors and who will also 'animate' the synthetic world. In military applications these staff may be referred to as the 'White Force' and they acts as teachers, examiners and also as role-players (for example, role-playing the opposing force in a military training scenario). There will also be technical staff that operate and maintain the technical systems. For larger scale systems there may also be dedicated administrative staff.

Figure 12A:
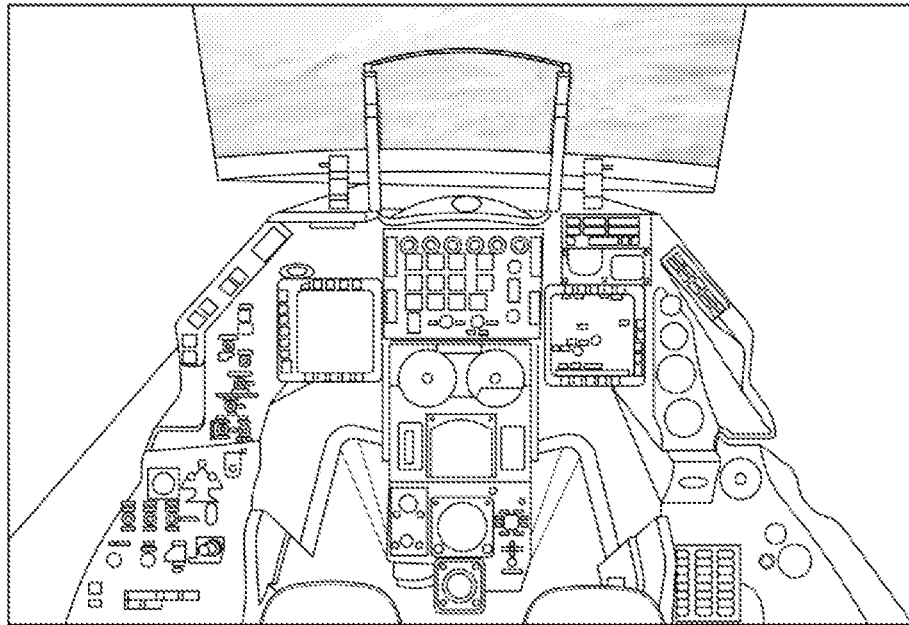
FIGS. 12A-12C shows schematics of simulators as suitable for use in the Networked Synthetic Training system of FIG. 11.
Figure 12B:
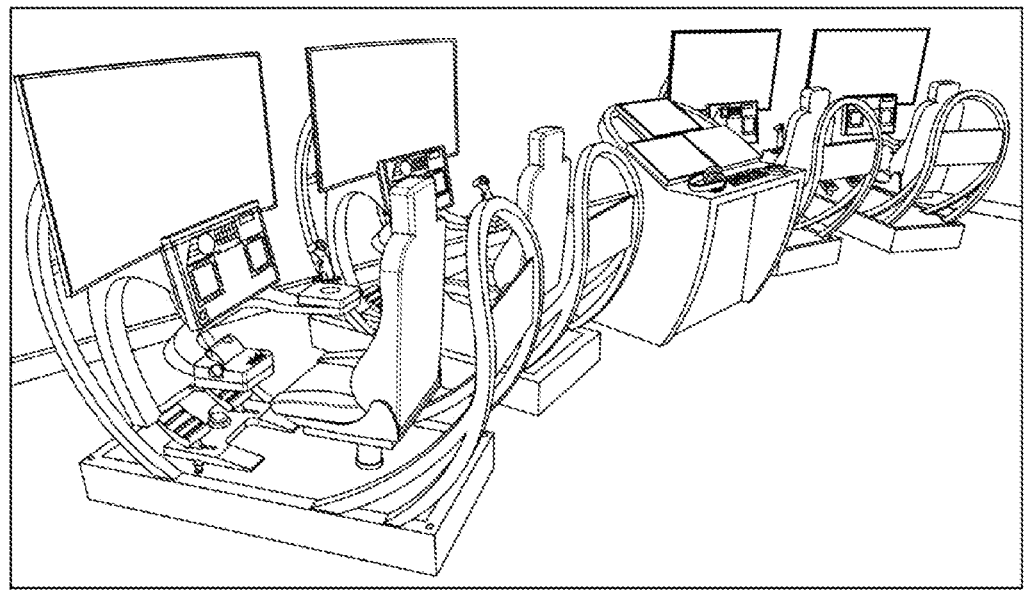
Figure 12C:

FIGS. 12A-12C show examples of simulators as may be used in the present embodiment. The simulator of FIG. 12A recreates the interior of the cockpit of a fighter plane, with the layout of the control panel being designed to mimic that of a real-life fighter plane. The screen displays a view of the plane's exterior environment, recreating the view that the pilot would see through the windows of the cockpit. As the user manoeuvres using the control panel, the image data displayed on the screen is updated to reflect the shift in the view seen through the cockpit's windows.

In the example of FIG. 12A, the body of the cockpit may be built on a platform that is designed to move in such a way as to mimic the real-life motion of the aircraft. For example, as the pilot pulls back on the control joystick, the platform may cause the cockpit to tilt upwards, so leading to the perception that the aircraft is climbing in a vertical direction.

FIG. 12B shows a bank of simulators having a different design from the simulator shown in FIG. 12A. Each simulator comprises a control panel and a screen to display a view of the exterior environment. Unlike in the example of FIG. 12A, the simulators in FIG. 12B are not intended to replicate a specific vehicle but can be used to train people in operating a range of different vehicles. In this example, each simulator has a seat on which the user sits when operating the simulator. The seat may be arranged to move in three dimensions in response to the user's controls, again helping to create the perception that the user is in an actual vehicle when operating the controls.

FIG. 12C shows an example of an instructor's control panel, through which an instructor or other training officer can interact with and influence events in the simulated environment in which the vehicle simulator(s) operate. The instructor may, for example, introduce computer-generated forces (other vehicles, or people) into the simulated environment; these forces may then be controlled by the instructor or else could be automated to perform certain roles during a training event.

Referring back to FIG. 11, the Networked Synthetic Training system will be comprised of the simulators, and a network linking them together. By connecting to one or more servers in the network, the various simulators/control panels/user-carried devices are able to access a set of infrastructure tools and services that facilitate the delivery of coherent training to participants in the training event. A single, browser based, portal may be used to login to the training system and access all the tools within the system. Examples of the types of tools that may be employed are: Learning management, Scenario development, Computer Generated Forces (CGF), Weapons Server, Environment Server, Multi-spectral databases, Exercise control, After action review, Network monitoring etc. Examples of the types of services that may be provided are: Training Development, Requirements Management, Training Event Management, Training Assessment, Technical Management, Technical Integration, Technical Development and Maintenance, Asset Management, Security Management etc.

Figure 13A:
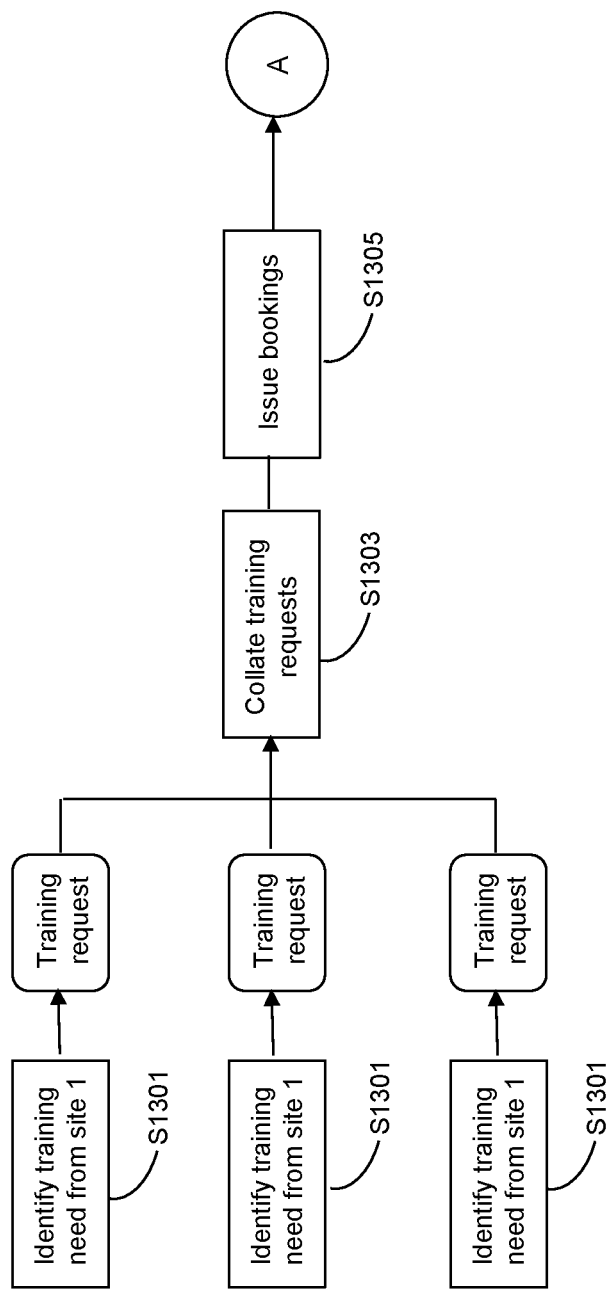
FIG. 13A-13B show a flow chart of steps for setting up a training event in the Networked Synthetic Training system of FIG. 11.
Figure 13B:
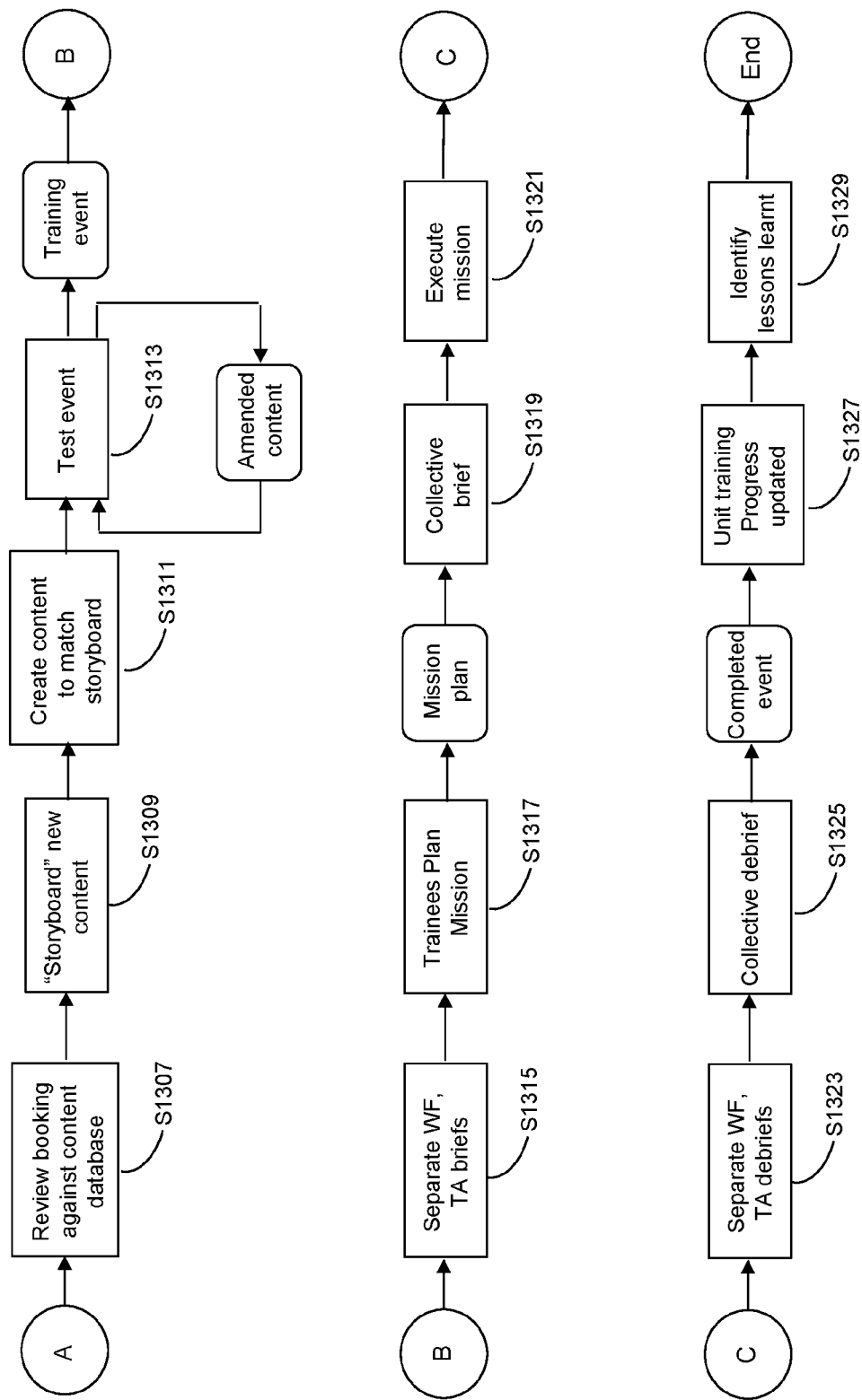

FIGS. 13A and 13B show a schematic flow-chart for setting up the training event. The process begins with a planning phase, during which a training officer at each site determines the training need for personnel located at those sites. The training officers submit respective training requests to the system (step S1301); typically, these requests will be specified in the form of a written communication, such as by email to a central processing server. Several requests can be collated to define a particular training event (step S1303). The requests may specify, for example, a type of vehicle that is desired, the time scale during which training is to take place, and the type of training required; for example, it might be desired for the users to practice joint manoeuvring e.g. flying in tight formation across a particular type of terrain, or to set up a combat mission involving military vehicles such as tanks or aircraft in which the various individuals are required to engage each other in battle or work collaboratively to engage a common enemy. A training event may comprise several stages; for example, once a mission is complete, a post-event stage may be scheduled in which the training personnel can discuss and provide feedback on the participants' performance during the mission. The mission itself may also be preceded by a briefing stage. If the training scenario is requested to take place at a certain time, then this may be entered in a scheduling database or booking system, with time slots being allocated for the training event(s) (step S1305).

Figure 14:
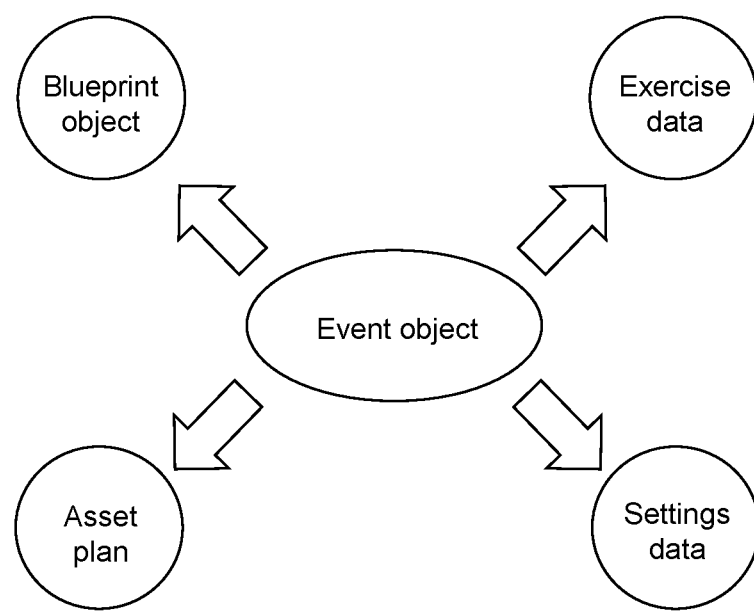
FIG. 14 shows an example of an event object according to an embodiment.

The received training requests are used to generate an event object, which defines the training scenario by specifying when the training event is to take place and which primary assets (including the simulators, for example) will be involved. The event object also describes the simulation environment to be established and may describe a time-flow for how the simulation environment is due to change or evolve during the course of the training exercise. Referring to FIG. 14, the event object itself comprises several components:

- The asset plan specifies the list of primary assets to be used or established when setting up the simulation environment.
- The blueprint object, or baseline framework description describes the common frameworks that assets can be related to. These frameworks may include, for example, basic networks or base components of the deployment and monitoring system
- Exercise data may include plans, documents, and databases to be used in the training scenario by the assets, the participants in the training scenario, and the training staff. Items within the exercise data set may be viewed and modified either directly within the working environment or via tools launched from it.
- Settings data may be explicitly defined or may rely on defaults or be automatically assigned depending on the parameter, the requirements of the assets and the state of the environment where the event is being configured.

In one example, the event object may be such as to define a preliminary training set-up as part of the planning phase. For example, the asset plan in the event object may include two or more primary assets for use in creating a test platform, in which different aspects of the simulation can be modified prior to the training event being implemented. Here, the term "test platform" can be understood to comprise a networked group of hardware and/or software assets, which together can be used to test-run the simulated environment that will be used during the training event itself. The assets to be used in this part of the planning phase may comprise a subset of those that are to be used during the training event itself; for example, the test platform may incorporate software components that are to be used in generating the simulated environment in the training event, without requiring all (or any) of the physical simulators to be connected to one another.

Having identified the primary assets within the asset plan, the server now accesses the asset metadata repository to identify which additional assets are required in order to provide the necessary connectivity between those primary assets.

The server uses the asset metadata to generate a hierarchical dataset of assets, as described earlier, and to select from that hierarchy a group of assets to use in establishing the necessary connectivity between the primary assets. As part of this process, the server may refer to the scheduling database to check for scheduling conflicts i.e. to check that resources for the test platform are not already scheduled for use at the proposed time at which the test platform is to be set-up and used. If the event object specifies a particular time at which training is to take place (because, for example, that is the only time that all the necessary participants are available), then any scheduling conflicts are taken into consideration when selecting which assets in the initial hierarchical dataset to retain for the asset deployment plan. If no such time has been specified in the event object, the system may identify and output a suggested "best-time" for the event and the planning phase that precedes the event, which provides the most effective selection and configuration of assets.

Once the requisite assets and settings have been selected, an asset deployment plan for the test platform can be generated. The test platform, which as discussed above, may comprise a networked configuration of different components—can allow personnel to trial different versions of software and/or hardware components as part of the process of generating the simulated environment. In addition, once the test platform is established, personnel can use that platform to run test events, with different parameters. For example, test events may be run using different display parameters and/or image data for generating the simulated environment, and an optimal configuration for generating the simulated environment may be determined (steps S1309-S1313).

Once testing is complete, the process may proceed to the event or mission phase, in which the actual training event is carried out. As part of the mission phase, training briefs are generated and forwarded to those participating in the training event (steps S1315-S1319). Following this, the mission is executed (Step S1321).

Since the training event may require the use of some assets that were not present in the test platform—for example, the training event may include the use of actual physical simulators that were not themselves used as part of the test platform—it is desirable to re-run the sequence of steps of FIG. 1 in order to determine the group of assets that will be implemented in the training event. The event object as used to implement the test platform may be updated accordingly to include those primary assets that are now required for the training event, but which were not present in the test platform, and the steps of FIG. 1 rerun so as to identify the required assets for the training event and provide the necessary connectivity between them.

It will be appreciated here that the set of assets identified for the training event may be influenced by the selection of assets used in the test platform. For example, in the event a particular group of assets is determined to provide an optimal version of the simulated environment during the tests carried out with the test platform, the metadata for those assets may be updated to specify that such assets are to be used collectively going forwards; thus, when it comes to the actual deployment of assets for the training event, the particular selection of assets may be one that would not ordinarily have been chosen, were it not for the preceding work done using the test platform to optimise performance.

Following completion of the mission, a debrief phase may take place in which the performance of the various participants is evaluated and feedback given to them (steps S1323 to S1327). At the same time, the performance of the assets as monitored during the training event may also be evaluated and used to update the metadata in the asset metadata repository as described above, such that future training events can be further optimised.

It will be appreciated that, in some embodiments, the system may receive requests to run more than one training events concurrently; that is, the system may receive a request for one group of users to undergo a particular type of training in which they interact with one another in a first simulated environment, whilst another request is received for a second group of users to undergo different training by interacting with one another in a different simulated environment. As discussed previously, where these requests require that the events take place at the same time (i.e. there is a scheduling conflict between them), the two requests may be processed in parallel, in a way that seeks to optimise the asset deployment plan for each event whilst still allowing both events to proceed alongside one another. In this respect, the need to identify and select the optimal combination and configuration of assets may apply to individual phases of the event, as well as the event as a whole; for example, it may be necessary to generate respective asset deployment plans for two test platforms intended to be operational at the same time as one another, as well as generating asset deployment plans for the actual mission phase in each event.

In some cases, where a first event comprises two or more phases, and a separate asset deployment plan is generated for each phase, the decision as to how to process a request for a wholly separate (second) event coinciding with the first event may be dependent on the relationship between the asset deployment plans established for each phase of that first event. For example, a request may be received to run a first event comprising a test phase and a mission phase, with respective deployment plans being generated for the test phase and mission phase. Subsequently, another request may be received to run a second event that will overlap with the mission phase of the first event. In accordance with embodiments discussed above, where such a scheduling conflict occurs, a decision may be made to re-generate the asset deployment plan for the mission phase of the first event at the same time as generating the asset deployment plan for the second event. However, if the asset deployment plan for the mission phase of the first event draws on data contained in the deployment plan for the test phase of the first event (for example, the deployment plan for the mission phase specifies that a particular selection of assets contained within the deployment plan for the test phase is also to be used in the deployment plan for the mission phase), then that requirement may take precedence over the need to manage resources when scheduling the second event to run at the same time as the mission phase of the first event. In other words, the asset deployment plan for the mission phase of the first event may remain at least partially fixed by virtue of its dependency on the deployment plan of the test phase of the first event, and any re-evaluation of the deployment plan for the mission phase of the first event may only be carried out subject to that constraint. (It will be appreciated here that whilst this example refers to a case of a training event having a "test phase" and a "mission phase", the same logic will apply to any type of event having more than one phase, where it is desired to run another separate event that coincides with one or more of those phases).

In general, embodiments as described herein can serve to establish a Networked Synthetic Training system having one or more of the following features:

A workflow structure to ensure users know what activities need to be carried out at what time and with what tools.
A permissions system so that users can only make changes to the system where they are supposed to.
A data model that enables the user to configure how available assets should be linked together and setup for a particular training exercise.
A deployment mechanism that automates the deployment of networks and software for training delivery (according to the asset deployment plan).
A monitoring mechanism so that support staff can observe the performance of the system during exercises and be made aware of any issues.
A data collation and feedback process for greater flexibility, agility and efficiency in supporting rapidly changing training requirements, technology insertions, application updates and performance of computing/network platforms.

Embodiments such as that described above can provide a number of advantages over conventional approaches to Networked Synthetic Training. Conventionally, systems for Networked Synthetic Training have offered completely bespoke solutions produced using components sourced by industry integrator(s). These components are typically proprietary or Commercial Off The Shelf (COTS) components, or more commonly a mixture of both. COTS components have been growing in popularity to the extent that most training systems use them. However specialised integration skills have been needed to use them, and issues with licensing regimes and updates can occasionally be problematic for systems that are not connected to the internet in order to meet security accreditation requirements.

A further issue has been that the data needed to run simulations (including object model data, terrain data, for example) is also expensive to source and often requires government and/or end user assistance to procure. This has led to governments around the world to start to produce catalogues and repositories of terrain and model data to encourage reuse and to mandate standards to ensure that components within a proprietary training solution can be partitioned to allow for easier upgrade.

More generally, it currently takes a lot of time, money and people to setup heterogeneous distributed simulation environments to carry out collective training. Training events are complicated to set up due to the disparate nature of the components that make up collective training, their physical separation, legacy issues, and non-standardisation. Reliable reproduction of events is difficult to achieve and refinement of events often requires lengthy re-testing due to the number of assets involved and the requirement for synchronisation of the disparate components.

Embodiments described herein can help to resolve the above problems, in such a way as to make the task as efficient as possible. In the described embodiments, the assets to be used can be selected based on a number of criteria, harvested at least in part from the asset metadata repository. Through use of the metadata, and intelligent learning from dynamic data, it is possible to optimise the configuration used to provide the operating environment for a particular event. The metadata itself is able to be dynamically updated based on lessons learnt and dynamic feedback, with "trade-off" decisions on selection/use of assets in turn becoming intelligence-based, by utilising the information contained in the asset metadata. Furthermore, the asset metadata, trade-off decisions and "best" assets can be expertly evaluated to provide re-use sub-compositions which can be ensured for reproduction in the future and pre-accreditation. Using such refined knowledge, it is possible to automate compositions/sub-compositions that are resilient to change and best fit the majority of training needs.

Embodiments allows for multiple configurations to exist and be compared and/or measured against changing criteria, or time and resource constraints. Embodiments allow for feedback on the asset data and performance of assets, including connectivity, such that the deployment choices can be continuous refined for any potential circumstances. Over time the assets and resources will inevitably update and the stored deployments will require need to be revalidated to deliver the same training event as before. This ability for continuous integration and validation ensures continued support for future training more readily then starting over each time. By doing so, embodiments described herein can help to enhance the training event support, whilst reducing the cost of production and execution of such events.

It will be understood that implementations of the subject matter and the operations described in this specification can be realized in digital electronic circuitry, or in computer software, firmware, or hardware, including the structures disclosed in this specification and their structural equivalents, or in combinations of one or more of them. Implementations of the subject matter described in this specification can be realized using one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

While certain embodiments have been described, these embodiments have been presented by way of example only and are not intended to limit the scope of the invention. Indeed, the novel methods, devices and systems described herein may be embodied in a variety of forms; furthermore, various omissions, substitutions and changes in the form of the methods and systems described herein may be made without departing from the spirit of the invention. The accompanying claims and their equivalents are intended to cover such forms or modifications as would fall within the scope and spirit of the inventions.

The invention claimed is:

1. A computer implemented method of providing connectivity between two or more primary assets, each primary asset comprising a hardware component or a software component, the method comprising:
   receiving a request to provide connectivity between the primary assets;
   accessing a repository that stores a list of assets and metadata associated with each asset, each asset comprising a hardware or software component, wherein the metadata associated with each asset specifies operating parameters for the asset and support requirements for the asset;
   using the metadata in the repository to generate an hierarchical list of assets, wherein a first level in the hierarchy comprises the primary assets, and each subsequent level in the hierarchy specifies one or more additional assets that are capable of meeting support requirements of the assets in a preceding level of the hierarchy;
   rationalising the hierarchical list of assets by selecting a group of assets from the hierarchical list of assets to be used in providing connectivity between the primary assets;
   generating, based on the operating parameters of each asset in the group of assets, a deployment plan for the group of assets, wherein the deployment plan defines settings and/or connections to be used between the assets in the group of assets in order to provide connectivity between the two or more primary assets; and
   deploying the assets in accordance with the deployment plan in order to provide connectivity between the primary assets.

2. A computer-implemented method according to claim 1, wherein in the event the selected group of assets contains two or more additional assets that cannot be connected to one another directly, the method comprises identifying a bridging asset to provide an interface between those assets.

3. A computer-implemented method according to claim 1, wherein the step of rationalising the hierarchical list of assets comprises identifying one or more of the assets in the hierarchical list as being redundant in view of other asset(s) already identified as providing the necessary support requirements;
   wherein in generating the deployment plan, the one or more redundant assets are excluded from the deployment plan.

4. A computer-implemented method according to claim 3, wherein the assets in the hierarchical list that are to be included in the group of assets are selected by considering one or more cost(s) associated with using each asset in the hierarchical list,
   wherein the cost(s) associated with a respective asset are stored as cost data in the metadata associated with that asset in the repository, and
   wherein the cost data associated with an asset is determined based on one or more of:
   a cost of connecting to a network using the asset;
   a license fee associated with use of the asset;
   compute requirements for the asset;
   a start-up time for the asset.

5. A computer-implemented method according to claim 4, wherein each cost associated with an asset is weighted by a respective weighting factor, the request to provide connectivity between the two or more primary assets specifies one or more connection criteria to prioritise, wherein weighting factors are adjusted based on the connection criteria, and the connection criteria that are to be prioritised include one or more of:
   a speed of the connection;
   the fidelity with which data is transferred between the primary assets;
   minimising computer resource footprint;
   efficient usage of licenses; and
   time required for start-up of the system.

6. A computer-implemented method according to claim 1, wherein the asset deployment plan comprises instructions for returning each asset to its initial state, once it is no longer necessary to maintain connectivity between the primary assets.

7. A computer-implemented method according to claim 1, further comprising monitoring a performance of one or more of the assets during their operation and updating the metadata associated with the respective asset in the repository to reflect the measured performance.

8. A computer-implemented method according to claim 1, further comprising storing the deployment plan in memory for use in the event that a subsequent request to provide connectivity between the same two or more primary assets is received and storing a snapshot of the selected group of assets,
  wherein upon receiving the subsequent request to provide connectivity between the same two or more primary assets, the method comprises:
    determining an extent to which the asset metadata associated with the assets contained in the stored deployment plan has changed since the deployment plan was created;
    determining, based on the extent to which the asset metadata has changed, whether to use the stored deployment plan to provide connectivity between the assets, and
    in the event it is desired not to use the stored deployment plan, determining, based on the extent to which the metadata has changed, whether to generate a new deployment based on the stored snapshot of the selected group of assets.

9. A computer-implemented method according to claim 8, further comprising storing a snapshot of the hierarchical list of assets,
  wherein in the event it is determined not to generate a new deployment plan based on the stored snapshot of the selected group of assets, the method comprises:
    determining, based on the extent to which the asset metadata has changed, whether to generate a new deployment based on the stored snapshot of the hierarchical list of assets; and
    in the event it is desired not to use the stored snapshot of the hierarchical list of assets for generating a deployment plan, generating an entirely new deployment plan.

10. A computer-implemented method according to claim 8, wherein determining an extent to which the asset metadata associated with the assets contained in the stored deployment plan has changed comprises:
  identifying the changes made to the asset metadata of each asset contained in the stored deployment plan; and/or
  determining the overall number of assets contained within the stored deployment plan for which a change in the asset metadata is identified.

11. A computer-implemented method according to claim 1, wherein the request to provide connectivity between the primary assets specifies a time period during which connectivity is required, the method further comprising:
  retrieving scheduling information specifying a time(s) at which each one of the assets in the hierarchical list of assets is scheduled to be in use; and
  determining whether one or more assets that are contained in the hierarchical list of assets and which it is desired to include in the deployment plan are unavailable during the time period as a result of having already been scheduled for use in that period,
  wherein in the event that it is desired for an asset in the hierarchical list of assets to be included in the deployment plan, but the desired asset is determined to be unavailable during the time period, a determination is made as to whether an alternative asset can be used to perform the role of the desired asset, so as to enable the desired asset to be made available during the time period.

12. A computer-implemented method according to claim 11, comprising:
  retrieving an earlier deployment plan in which the desired asset has been scheduled for use during the time period, and in view of which the desired asset is unavailable for inclusion in the present deployment plan;
  retrieving details of an earlier request that has led to generation of the earlier deployment plan; and
  re-evaluating the earlier request in tandem with the present request, so as to generate a new asset deployment plan for the earlier request and a new deployment plan for the present request.

13. A computer-implemented method according to claim 12, wherein:
  the earlier deployment plan is one that has been generated for a particular phase of a first event specified in the earlier request, the first event comprising two or more phases, each phase having its own respective deployment plan;
  wherein, in the event that the earlier deployment plan event references a subset of assets contained in the deployment plan(s) for one or more of the other phases of the first event, the generation of the new deployment plan for the earlier request is carried out subject to the condition that the new deployment plan should still reference the same subset of assets contained in the deployment plan(s) for the one or more other phases of the first event.

14. A computer-implemented method according to claim 1, comprising:
  receiving two or more requests to provide connectivity between two or more primary assets, the two or more requests each specifying a respective time period during which connectivity is required;
  wherein in the event that the time periods specified in the two requests overlap with one another, the method further comprises evaluating the two requests in tandem with one another, so as to provide a respective deployment plan for each request.

15. A computer-implemented method according to claim 1, wherein the request to provide connectivity between the two or more primary assets specifies an event having two or more phases, the method comprising generating a respective asset deployment plan for each phase of the event,
  wherein the phases comprise a first phase and a second phase, and
  wherein the deployment plan for the first phase comprises a subset of the assets that are selected for use in the second phase.

16. A computer-implemented method according to claim 1, wherein each primary asset comprises a vehicle simulator or a computer control station, each primary asset having a control panel for inputting commands and a display screen;
  wherein the deployment plan comprises settings and connections to be used for generating a shared simulation environment for users of the simulators and/or computer control stations,
  wherein the shared simulation environment comprises image data to be displayed on the display screen of each primary asset, the image data that is displayed on each display screen being updated to reflect commands input by the users in their respective control panels.

17. A computer-implemented method according to claim 16, wherein in advance of generating the final deployment plan, a test deployment plan is generated, the test deployment plan comprising a group of assets that when connected will facilitate testing of operation of the simulation environment, and wherein the asset metadata for one or more assets used in the test deployment plan is updated in response to testing of the simulation environment, the final deployment plan being generated using the updated metadata.

18. A computer-implemented method comprising:
transmitting, from a client terminal to one or more servers, a request to provide connectivity between two or more primary assets, each primary asset comprising a hardware component or a software component, wherein the one or more servers are configured to:
receive the request to provide connectivity between the primary assets;
access a repository that stores a list of assets and metadata associated with each asset, each asset comprising a hardware or software component, wherein the metadata associated with each asset specifies operating parameters for the asset and support requirements for the asset;
use the metadata in the repository to generate an hierarchical list of assets, wherein a first level in the hierarchy comprises the primary assets, and each subsequent level in the hierarchy specifies one or more additional assets that are capable of meeting support requirements of the assets in a preceding level of the hierarchy;
rationalise the hierarchical list of assets by selecting a group of assets from the hierarchical list of assets to be used in providing connectivity between the primary assets; and
generate, based on the operating parameters of each asset in the group of assets, a deployment plan for the group of assets, wherein the deployment plan defines settings and/or connections to be used between the assets in the group of assets in order to provide connectivity between the two or more primary assets;
the method further comprising:
receiving, at the client device, a copy of the deployment plan from the one or more servers; and
configuring one or more of the primary assets in accordance with the details specified in the deployment plan.

19. A computer system for providing connectivity between two or more primary assets, each primary asset comprising a hardware component or a software component, the computer system comprising a processor and memory, and being configured to:
receive a request to provide connectivity between the primary assets;
access a repository that stores a list of assets and metadata associated with each asset, each asset comprising a hardware or software component, wherein the metadata associated with each asset specifies operating parameters for the asset and support requirements for the asset;
use the metadata in the repository to generate an hierarchical list of assets, wherein a first level in the hierarchy comprises the primary assets, and each subsequent level in the hierarchy specifies one or more additional assets that are capable of meeting support requirements of the assets in a preceding level of the hierarchy;
rationalise the hierarchical list of assets by selecting a group of assets from the hierarchical list of assets to be used in providing connectivity between the primary assets;
generate, based on the operating parameters of each asset in the group of assets, a deployment plan for the group of assets, wherein the deployment plan defines settings and/or connections to be used between the assets in the group of assets in order to provide connectivity between the two or more primary assets; and
deploy the assets in accordance with the deployment plan in order to provide connectivity between the primary assets.

20. A system according to claim 19, further comprising:
two or more simulators; and
one or more servers configured to perform the method, wherein the primary assets include at least two of the simulators, and the deployment plan generated by the one or more servers comprises settings and connections to be used between the assets in the group of assets, in order to generate a shared simulation environment for users of the simulators.

* * * * *